United States Patent [19]
Inoue et al.

[11] Patent Number: 5,416,374
[45] Date of Patent: May 16, 1995

[54] ULTRASONIC MOTOR AND ELECTRONIC APPARATUS EQUIPPED WITH ULTRASONIC MOTOR

[75] Inventors: Tatsunori Inoue; Masao Kasuga; Makoto Suzuki; Kenji Suzuki; Fujio Ozawa; Ko Yamazaki; Shinichi Hayashizaki, all of Tokyo, Japan

[73] Assignee: Seiko Instruments Inc., Japan

[21] Appl. No.: 88,181

[22] Filed: Jul. 6, 1993

[30] Foreign Application Priority Data

Jul. 24, 1992 [JP] Japan .................................. 4-198601
May 20, 1993 [JP] Japan .................................. 5-118809

[51] Int. Cl.⁶ .............................................. H01L 41/08
[52] U.S. Cl. ..................................... 310/317; 310/316; 310/323; 318/116
[58] Field of Search ............... 310/323, 328, 316, 317; 318/116

[56] References Cited

U.S. PATENT DOCUMENTS

| | | | |
|---|---|---|---|
| 4,560,263 | 12/1985 | Katsuma | 310/317 X |
| 4,794,294 | 12/1988 | Shimizu et al. | 310/316 |
| 4,954,742 | 9/1990 | Izukawa | 310/316 |
| 5,025,186 | 6/1991 | Tsukada | 310/323 |
| 5,229,678 | 7/1993 | Miyazawa | 310/323 |
| 5,237,237 | 8/1993 | Ueda et al. | 310/323 |
| 5,247,220 | 9/1993 | Miyazawa et al. | 310/323 |

FOREIGN PATENT DOCUMENTS 0416884 3/1991 European Pat. Off. .
0495665 7/1992 European Pat. Off. .

Primary Examiner—Mark O. Budd
Attorney, Agent, or Firm—Adams & Wilks

[57] ABSTRACT

An ultrasonic motor comprises a traveling wave generating circuit for generating a traveling wave signal effective to drive a moving member, and a standing wave generating circuit for generating at least one type of standing wave signal effective to stop movement of the moving member. A switching circuit is receptive of the traveling wave signal and the standing wave signal for selecting one of the traveling wave and the standing wave signals as an output signal. A piezoelectric vibrator drive circuit is receptive of the output signal of the switching circuit for producing a high-frequency voltage signal. At least one piezoelectric vibrator includes an electrode pattern and is adapted to be driven by the voltage signal to undergo expansion and compression. A vibrating member is fixed to the piezoelectric vibrator and vibrationally driven by the expansion and compression movement of the piezoelectric vibrator. A moving member is disposed on the vibrating member to be frictionally driven by expansion and compression movement of the piezoelectric vibrator. The moving member is provided with a plurality of load portions for stopping movement of the moving member, the load portions being greater in number than the number of nodes of the standing wave.

29 Claims, 29 Drawing Sheets

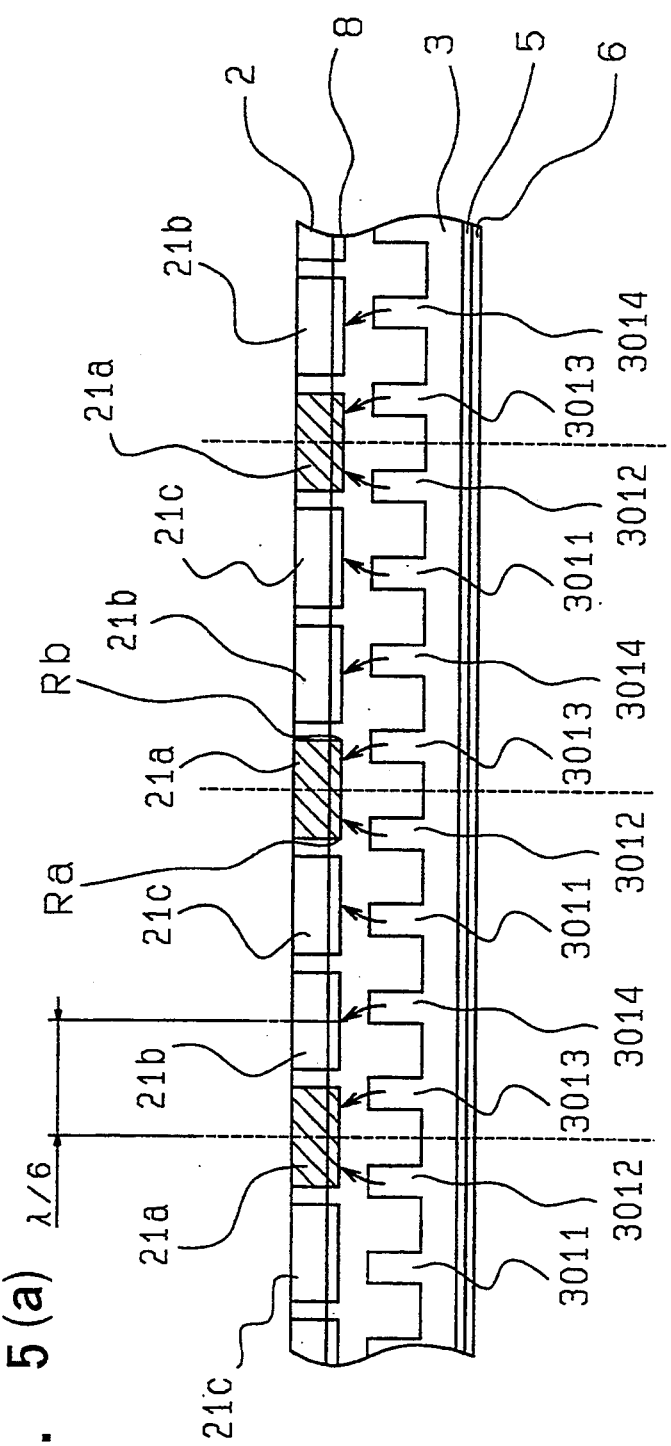
F I G. 5(a)
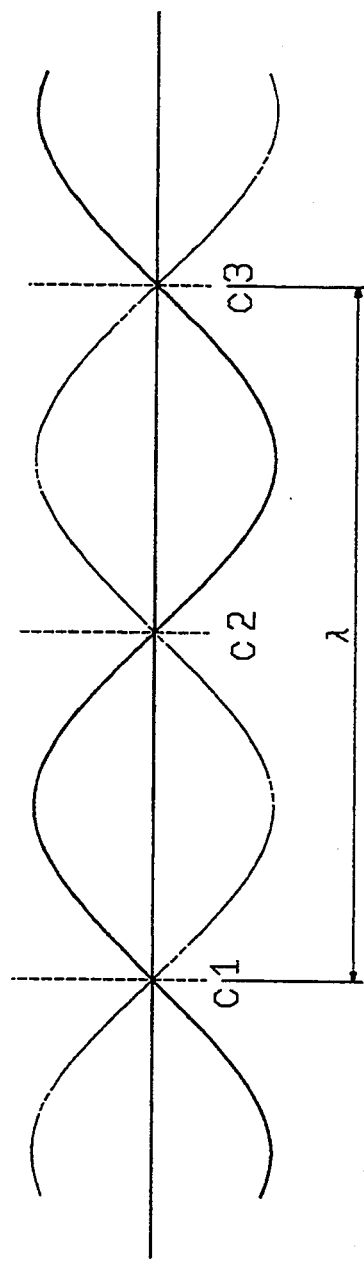
F I G. 5(b)

F I G. 9
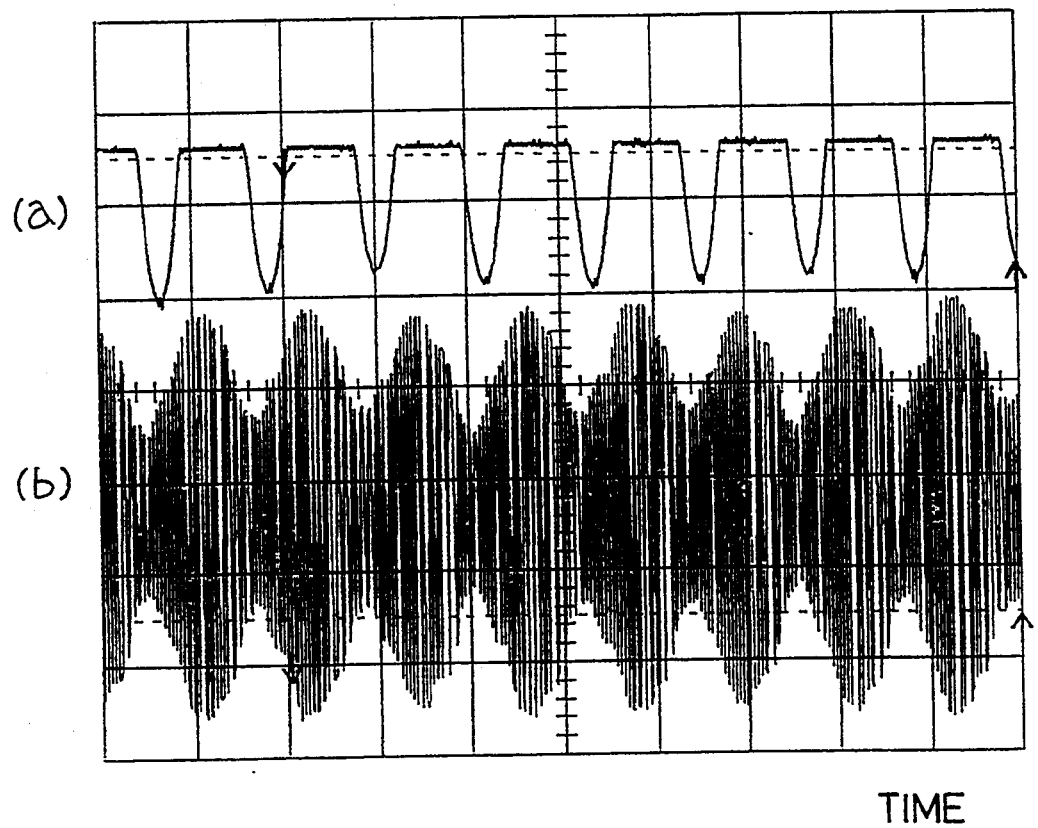

FIG. 10

| ELECTRODE DIVIDING NUMBER OF ELECTRODE | COMB-LIKE PROJECTION NUMBER | NUMBER OF NON-UNIFORM PORTIONS | WAVE-NUMBER /ROTATION |
|---|---|---|---|
| 12 DIVIDED | 22 | 15 | 6 |
| | | 16 | 16 |
| | 24 | 1 | 6 |
| | | 3 | 6 |
| | | 4 | 6 |
| | | 6 | 6 |
| | | 10 | 30 |
| | | 12 | 12 |
| | | 15 | 30 |
| | | 18 | 18 |
| | 25 | 0 | 6 |
| | | 15 | 6 |

F I G. 2 4
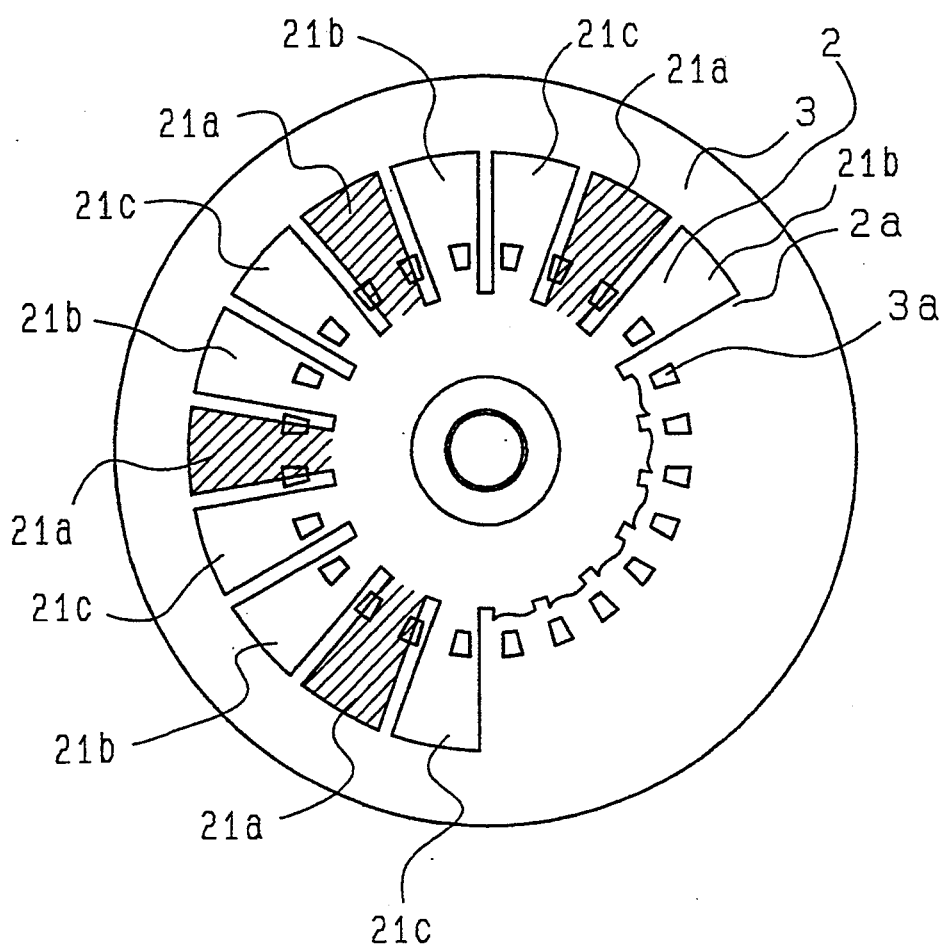

ULTRASONIC MOTOR AND ELECTRONIC APPARATUS EQUIPPED WITH ULTRASONIC MOTOR

BACKGROUND OF THE INVENTION

The present invention relates to an ultrasonic motor and an electronic apparatus equipped with such an ultrasonic motor for friction-driving a moving member by ultrasonic vibrations caused by utilizing compression-/expansion movement of a piezoelectric vibrator.

A conventional ultrasonic motor capable of realizing a stepping drive by a predetermined moving amount without using such a position detecting means as an encoder is constructed as described in Japanese Patent Publication No. JP-B-3-207281 (1991), or No. JP-B-4-38180 (1992).

FIG. 27 is a top view of the conventional ultrasonic motor capable of realizing a stepping drive by a predetermined moving amount without employment of such a position detecting means amounts as an encoder. A moving member 2701 has 4 convex portions 2701a and is in contact with a vibrating member 2702 having a projection portion 2702a.

FIG. 28 represents a positional relationship between a moving member 2801 and an electrode pattern structure of a piezoelectric vibrator 2803 fixed to a vibrating member 2802.

FIG. 29 is an operational explanatory diagram for showing vibration conditions when the conventional ultrasonic motor is driven in a stepping mode. Symbols shown in FIG. 29 correspond to those of FIG. 28. At a standing wave 1, A, B, C are combined with inverted A, inverted B, inverted C, respectively, which are vibrated under mutual phase shifts of 180°. As a result, a force is given to the convex portion 2801a of the moving member along a direction from the loop of the standing wave to the node thereof, and then this convex portion 2801a is positioned above the node of the standing wave 1 where the force becomes balanced. For another standing wave 2, B, C, inverted A are combined with inverted B, inverted C, A, respectively. For a further standing wave 3, C, inverted A, inverted B are combined with inverted C, A, B, respectively. The position of the node is stepwise moved by successively repeating the standing wave 1, the standing wave 2, the standing wave 3, the standing wave 1 in this order. Thus, the convex portion 2801a of the moving member 2801 is moved by a moving amount equal to this stepwise movement. In other words, with respect to the electrode pattern structure of the ultrasonic motor shown in FIG. 28, it is so constructed that the moving member 2801 is rotated by 1 turn with 12 steps.

However, in such a conventional ultrasonic motor capable of performing the stepping drive by a predetermined moving amount without using the position detecting means, e.g., the encoder, since the moving amount of the moving member in a stepping drive mode is determined by such a moving amount as the interval of the standing waves, or the node of the standing wave, the stepping angle of the moving member cannot be made smaller than the interval between the nodes of the standing waves, or the moving amount of node of the standing wave.

SUMMARY OF THE INVENTION

Accordingly, in order to solve such a problem in conventional ultrasonic motors, an object of the present invention is to provide an ultrasonic motor capable of setting a stepping angle of a moving member to a value smaller than either an interval between nodes of standing waves, or a moving amount of a node of a standing wave.

To solve the above-described problems, in an ultrasonic motor according to the present invention including:
- a piezoelectric vibrator having an electrode pattern;
- a vibrating member for fixing said piezoelectric vibrator and having a projection portion;
- a moving member depressed to said vibrating member and friction-driven by expansion/compression movement of said piezoelectric vibrator; and
- pressure regulating means for contacting said moving member to said vibrating member in a pressure regulating form, said ultrasonic motor comprises:
- an ultrasonic vibration generating circuit for generating a traveling wave used to drive said moving member, whose vibration wave number is "$\lambda$" and also for generating either one sort, or more than one sorts of standing waves used to stop said moving member;
- a switching circuit for switching operations of said traveling wave and of said standing wave; and
- at least one of said piezoelectric vibrator driven by said ultrasonic vibration generating circuit,
- said moving member having load portions used to stop said moving member during an oscillation of said standing wave, the number of said load portions being greater than the node number when the standing wave is oscillated, and both of the number of said load portions of said moving member and also the node number during the oscillation of the standing wave having at least one of common divisors corresponding to a positive integer greater than 1.

FIG. 1 is a functional block diagram for showing one example of the typical arrangement of an ultrasonic motor according to the present invention. In FIG. 1, an oscillating circuit 102 is operated by a power source 101 to output a predetermined output signal. An oscillating source such as a crystal oscillator is connected to the oscillating circuit 102. A dividing circuit 103 receives the output signal from the oscillating circuit 102 to frequency-divide this signal. A timing pulse generating circuit 104 receives the output signal from the dividing circuit 103 and outputs a predetermined timing pulse.

An ultrasonic vibration generating circuit 107 generates either a traveling wave for rotating a moving member 112, or a standing wave for stopping the rotation of the moving member 112.

A traveling-wave generating circuit 105 generates a traveling wave used to rotate the moving member 112.

A standing-wave generating circuit 106 generates a standing wave used to stop the rotation of the moving member 112.

Upon receipt of the output signal of the traveling-wave generating circuit 105 and the output signal of the standing-wave generating circuit 106, a switching circuit 108 controls an operation to output an output pulse to a piezoelectric vibrator drive circuit 109. The piezoelectric vibrator drive circuit 109 applies a predetermined high-frequency voltage to a piezoelectric vibrator 110. Ultrasonic vibrations are produced at the vibrating member 111 having a plurality of comb-like projection portions. The moving member 112 performs rotation and stopping operations, which has load portions for stopping the moving member when the standing wave is generated. The number of load portions is greater than the number of nodes when the standing wave is oscillated. A pressure regulating means 113 given constant pressure to the vibrating member 111 and the moving member 112. An output means 114 is operated by way of the operation of the moving member 112.

In accordance with the ultrasonic motor of the present invention, the moving member is stopped at a force-balanced position by switching the traveling wave for driving the moving member and the standing wave for stopping the moving member under a proper state, depending upon the position of the load portion of the moving member, the node position of the standing wave, and the projection portion position of the vibrating member. In other words, the stepping angle of the moving member may be made smaller than either an interval of the nodes of the standing waves, or a moving amount of the node of the standing wave.

BRIEF DESCRIPTION OF THE DRAWINGS

FIG. 5 is a sectional view for indicating stop conditions/vibration conditions of the ultrasonic motor according to the first embodiment of the present invention.

FIG. 9 shows a comparison diagram between the rotation conditions of the moving member and the current waveforms of the ultrasonic motor according to the first embodiment of the present invention.

FIG. 10 shows a table for showing a relationship among various conditions such as the subdividing number of the electrodes of the piezoelectric element employed in the ultrasonic motor according to the first embodiment of the present invention.

FIG. 24 is an upper view of a moving member of an ultrasonic motor according to an eighth embodiment of the present invention.

DETAILED DESCRIPTION OF THE PREFERRED EMBODIMENTS

Referring now to drawings, preferred embodiments of the present invention will be described.

First Embodiment

Figure 1:
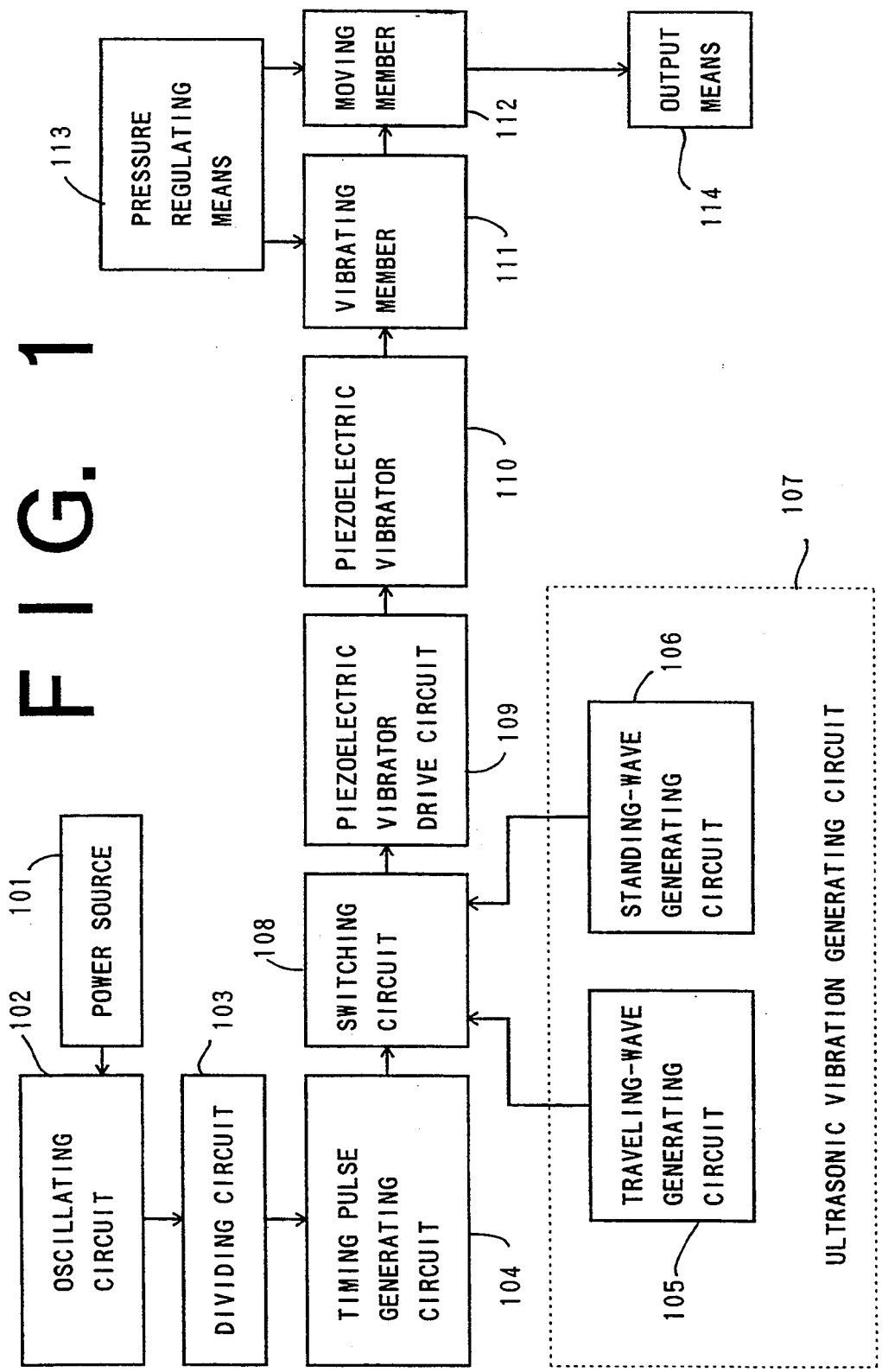
FIG. 1 is a functional block diagram for showing a typical arrangement of an ultrasonic motor according to the present invention.
Figure 2:
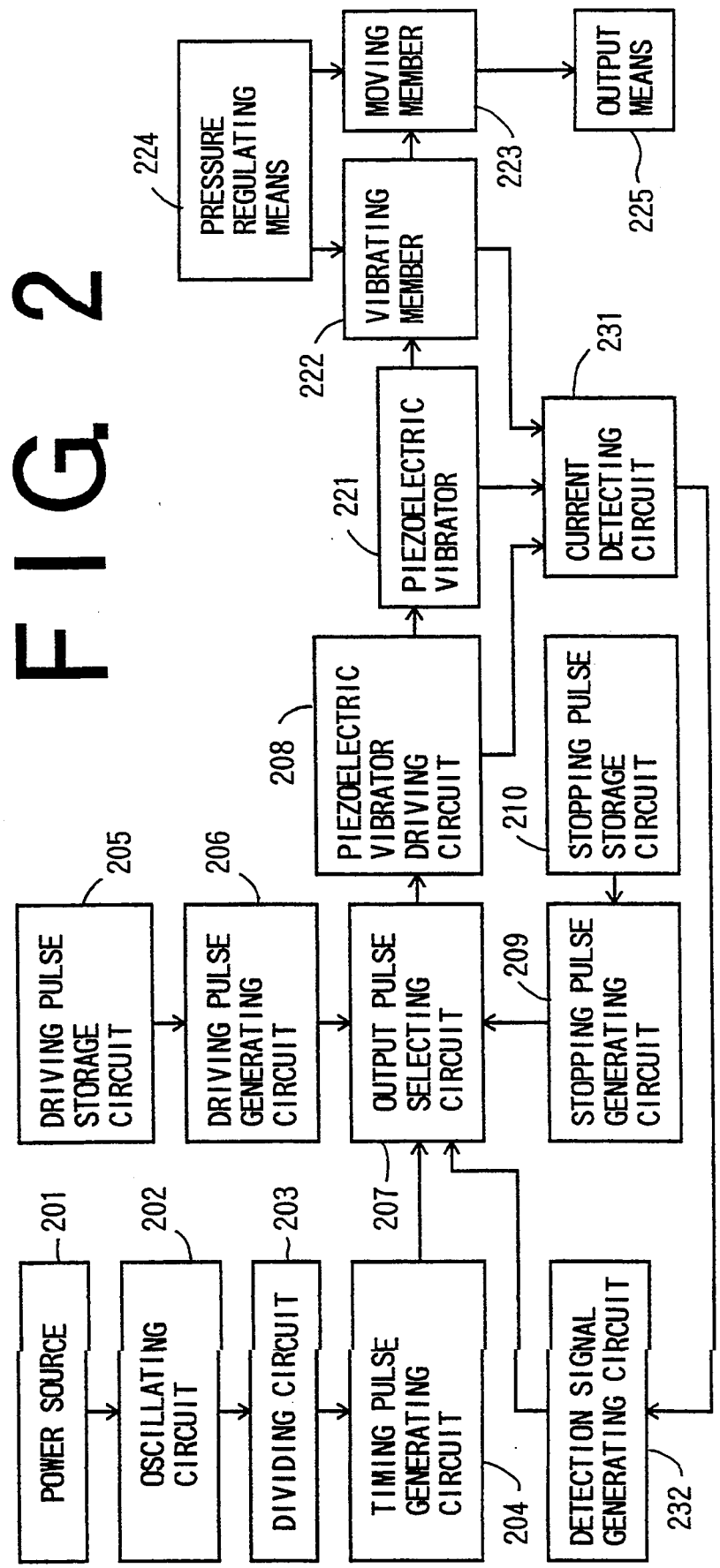
FIG. 2 is a system block diagram of an ultrasonic motor of a first embodiment.

FIG. 2 schematically shows a system block diagram of an ultrasonic motor according to a first embodiment of the present invention.

An oscillating circuit 202 is operated by a power source 201 and outputs a predetermined output signal. An oscillating source such as a crystal oscillator is connected to the oscillating circuit 202. A dividing circuit 203 receives the output signal of the oscillating circuit 202 to frequency-divide this output signal. A timing pulse generating circuit 204 receives the output signal from the dividing circuit 203 to output a predetermined timing pulse signal.

A current detecting circuit 231 is connected to at least one of a piezoelectric vibrator driving circuit 208, a piezoelectric vibrator 221, and a vibrating member 222, and receives such an output signal which is changed in accordance with either a load condition, or a rotation condition of the ultrasonic motor. When the ultrasonic motor is operated to drive the moving member 223, the output signals derived from the piezoelectric vibrator driving circuit 208, the piezoelectric vibrator 221, and the vibrating member 222 are changed. As the output signal, a current may be employed. A current detecting circuit 231 outputs an output signal corresponding to the detected current.

A detection signal generating circuit 232 outputs a detection signal corresponding to the detected current. A driving pulse storage circuit 205 stores driving pulses having various conditions suitable for generating the driving pulse in response to the rotation conditions of the moving member 223 of the ultrasonic motor. A driving pulse generating circuit 206 receives the output signal of the driving pulse storage circuit 205 to generate the driving pulse.

A stopping pulse storage circuit 210 stores a stopping pulse having various conditions suitable for generating such a stopping pulse in response to the rotation condition of the moving member 223 of the ultrasonic motor. A stopping pulse generating circuit 209 generates a stopping pulse by inputting the output signal of the stopping pulse storage circuit 210 into this stopping pulse generating circuit 209.

An output pulse selecting circuit 207 controls an operation to output an output pulse to a piezoelectric vibrator driving circuit 208 by inputting therein the output signal of the driving pulse generating circuit 206, the output signal of the stopping pulse generating circuit 209, and the detection signal of the detecting signal generating circuit 232. The piezoelectric vibrator driving circuit 208 applies a predetermined high-frequency voltage to the piezoelectric vibrator 221. Ultrasonic vibrations are produced at the vibrating member 222. The moving member 223 has a plurality of load portions for stopping the moving member when the standing wave is generated, performs various operations such as a rotation. A pressure regulating means 224 applies constant pressure to both of the vibrating member 222 and the moving member 223. An output means 225 is operated in response to the operation of the moving member 223.

Figure 3:
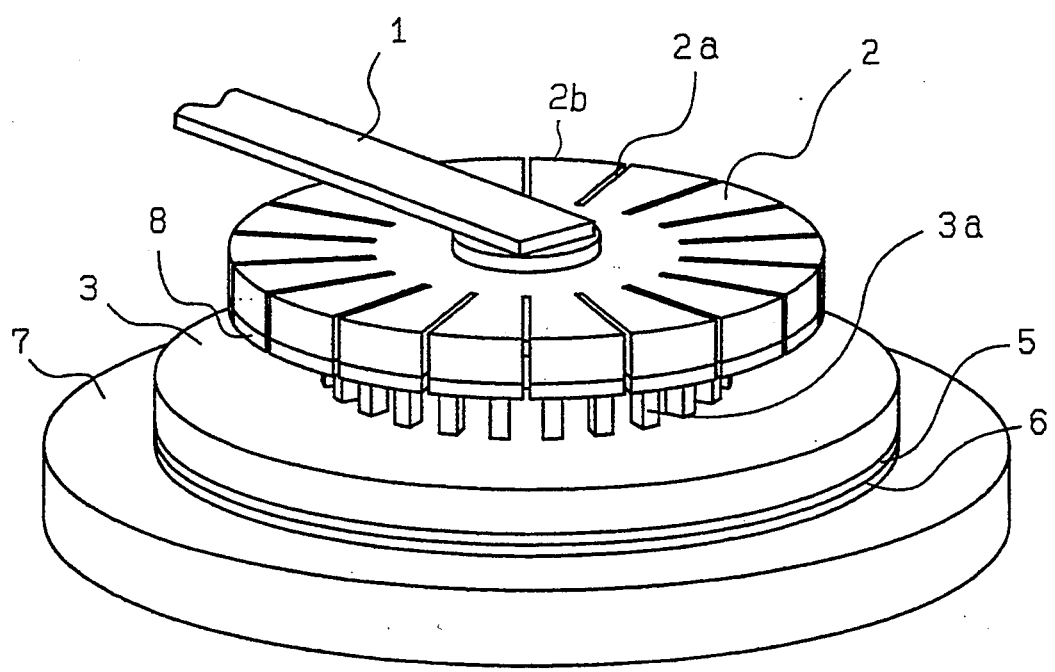
FIG. 3 is a perspective view of a structure of an ultrasonic motor according to the first embodiment of the present invention.

FIG. 3 is a perspective view of the ultrasonic motor 1 according to the first embodiment of the present invention. As shown in FIG. 3, a piezoelectric vibrator ( )5 generates a traveling wave used to drive the ultrasonic motor. Another piezoelectric vibrator ( )6 generates a standing wave used to stop the ultrasonic motor.

The moving member 2 has a plurality of slits portion 2a defining load portions 2b which have a tapered, non-uniform cross section when viewed in a radial direction of the moving member and which are used to stop the moving member 2 when the standing wave is produced. That is, the load portions 2b are each defined by a pair of slits 2a as shown in FIG. 3. The number of load portions 2b is larger than the number of nodes when one sort of standing wave is produced. The vibrating member 3 has a plurality of comb-like projection portions 3a which are fixed to a center shaft (not shown in the drawings). The center shaft is fixed to a fixing plate 7. The moving member 2 is in contact with the comb-like projection portion 3a of the vibrating member 3 via a friction member 8. The moving member 2 is assembled under a rotatable condition in such a manner that the center shaft is used as a rotation guide. A pressure regulating spring 1 depresses the moving member 2 against the comb-like projection portions 3a of the vibrating member 3 at a predetermined pressure.

FIGS. 4 and 5 are explanatory diagrams for representing an operation principle of the ultrasonic motor according to the first embodiment of the present invention.

Figures 4A, 4B:
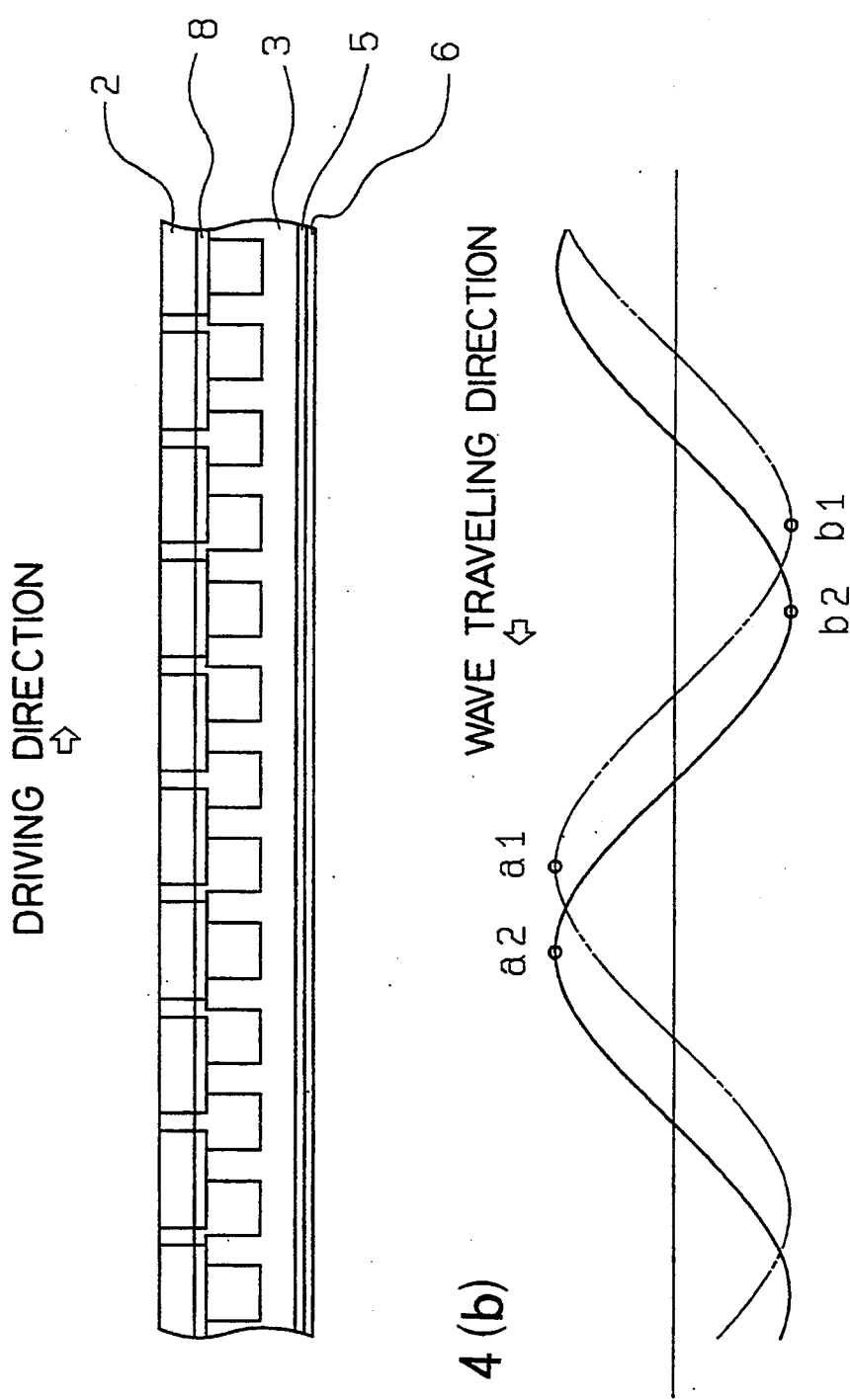
FIG. 4 is a sectional view for showing drive conditions/vibration conditions of the ultrasonic motor according to the first embodiment of the present invention.

FIG. 4 is a sectional view for indicating a drive condition and a vibrating condition of the first embodiment of the present invention. While the piezoelectric vibrator (A)5 for generating the driving traveling wave is operated (FIG. 4a), since such a traveling wave is generated such that the traveling wave is travels from a1 to a2 and b1 to b2, the moving member 2 having load portions 2b is driven along a direction opposite to the wave traveling direction (FIG. 4b).

FIG. 5 is a sectional view for indicating a stop condition and vibration condition of the ultrasonic motor according to the first embodiment. In this case, the comb-like projection portions of the vibrating member are arranged at a position located apart from the node of the standing wave, and 8 projection portions are arranged with respect to 1 standing wave. Also, the load portions of the moving member 2 are formed in an equiinterval under $\lambda/6$ intervals. For facilitating explanation of the behavior for the stop condition, in FIG. 5 the moving member 2 and the vibrating member 3 are separated.

In FIG. 5, when the operation of the piezoelectric vibrator ( )5 is stopped, and then, the piezoelectric vibrator ( )6 for producing the stopping standing wave is energized, as shown in FIG. 5(b), the standing waves are generated at the vibrating member 3 in such a manner that nodes of these standing waves are present at c1, c2, c3. Also, as shown in FIG. 5(a), forces are exerted are the comb-like projection portions 3011 to 3014 of the vibrating member 3 along an arrow; direction. At this time, when there is an unbalance in the force exerted on the side lower end portions Ra and Rb of the load portions of the moving member 2, the moving member 2 is rotated. However, when the moving member 2 reaches a position as shown in FIG. 5(a), such a relationship is established that the contact planes of the projection portions 3012 and 3013 are located under the end portions Ra and Rb of the load portions 21a. Then, a force is exerted from both sides of the side lower end portions Ra and Rb toward and inside of the load portions 21a. The load portion 21a are positioned at the node portions of the standing waves where these forces are balanced.

Also, as to the load portion 21b and 21c, forces are exerted along mutually opposite directions by the comb-like projection portions 3011 and 3014 of the vibrating member. At this time, since the projection portions 3011 and 3014 are positioned inside the side lower end portions Ra and Rb of the load portions 21b and 21c, the forces along the arrow directions are canceled with each other, as illustrated, which implies that no force is virtually exerted onto the load portions 21b and 21c. As a consequence, the moving member 2 is positioned by the inequality portion space 21a while the standing wave is generated.

As described above, the load portions of the moving member 2 are driven by the driving traveling wave ho the place near the node portion of the stopping standing wave, and then this driving traveling wave is instantaneously changed into the standing wave, so that the moving member 2 can be stopped at the correctly divided position, and also the stepping amount of the moving member 2 can be reduced to such a value smaller than the moving amount of the node portion of the standing wave. In the first embodiment, a minimum stepping amount may be set to $\lambda/6$.

It should be noted that as the switching timing between the driving traveling wave and the stopping standing wave, the moving member 2 is driven by the driving traveling wave to a range smaller than ±(minimum stepping amount)/2 with respect to a predetermined stopping position of the moving member 2, and then this traveling wave is changed into the standing wave. It should also be noted that although the driving piezoelectric vibrator is separately provided with the stopping piezoelectric vibrator in the above-described first embodiment, even if a single piezoelectric vibrator would be employed, the stepping drive could be achieved by switching the location of the separate electrode pattern and the applied voltage.

Figure 6:
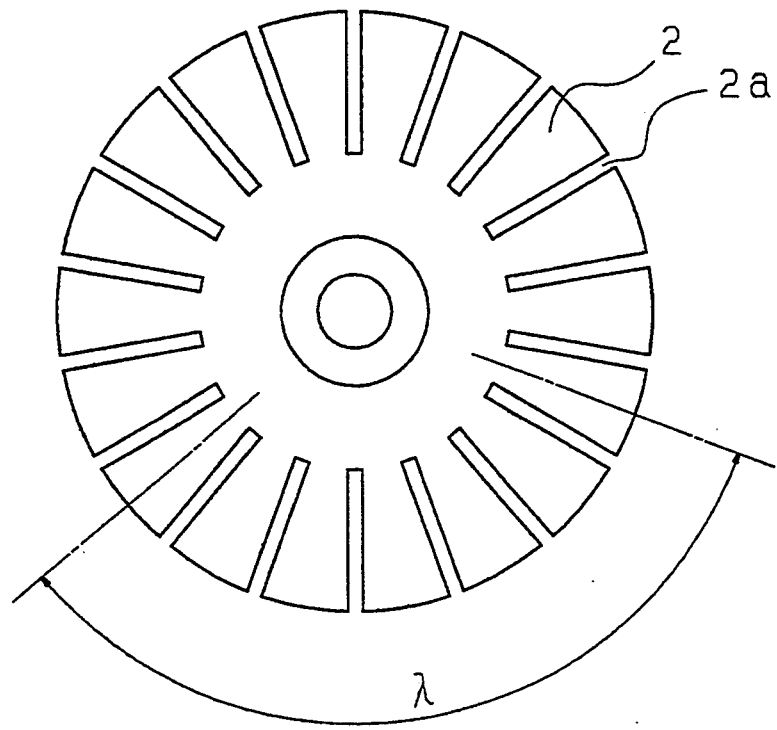
FIG. 6 is an upper view of the moving member of the ultrasonic motor according to the first embodiment of the present invention.

FIG. 6 is an upper view of the moving member 1 of the ultrasonic motor according to the first embodiment of the present invention. In FIG. 6, load portions 2a are provided on 18 places of the moving member along a circumferential direction in an equiinterval by 20°. A width of the load portions 2a is selected to be to a proper width such that the moving member is stopped when a standing wave is generated.

Figure 7:
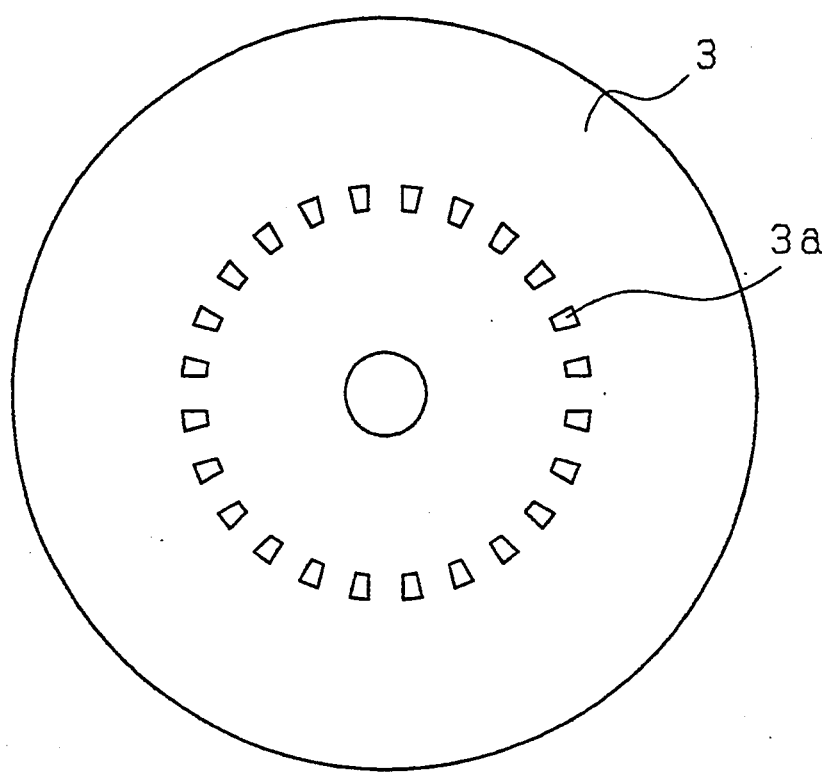
FIG. 7 is an upper view of the vibrating member of the ultrasonic motor according to the first embodiment of the present invention.

FIG. 7 is an upper view of the vibrating member of the ultrasonic motor according to the first embodiment of the present invention. In FIG. 7, the vibrating member is provided with 24 comb-like projection portions 3a which are arranged along circumferential direction at an equiinterval.

Figure 8:
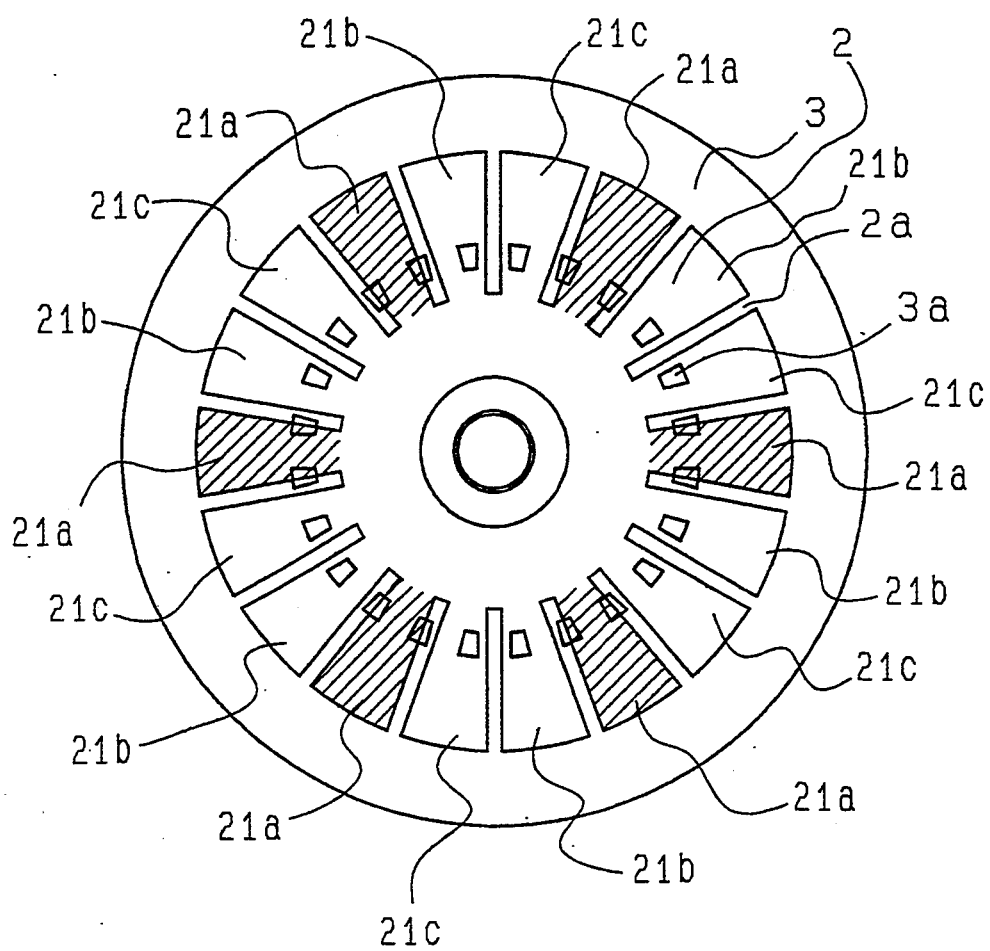
FIG. 8 is a fluoroscopic view for indicating the vibrating member/moving member of the ultrasonic motor according to the first embodiment of the present invention.

FIG. 8 is a fluoroscopic view of the vibrating member and the moving member of the ultrasonic motor 1 according to the first embodiment of the present invention. Symbols shown in FIG. 8 correspond to those of FIG. 5.

In FIG. 8 there is shown a positional relationship between the vibrating member and the moving member when a standing wave is produced under such a circumstance that the wave number of the standing wave is selected to be 3. Similar to the positional relationship of FIG. 5, when the comb-like projection portions are positioned apart from the node portion of the standing wave, the stopping position of the moving member 2, when the standing wave is generated, corresponds to the position as shown in FIG. 8. That is to say, the minimum stepping angle of the moving member 2 becomes 20 degrees by switching the driving traveling wave and the stopping standing wave. The load portions 21a positioned to the node portions due to an occurrence of the standing wave are formed at 6 places along the circumferential direction as shown in a hatched portion.

It should be noted that if at least 2 load portions are provided which are positioned to the node portions by generating the standing waves, a stable stopping condition of the moving member can be achieved when the standing wave is generated. In case that the load portions of the moving member are arranged in the equiinterval along the circumferential direction, and the wave number of the standing wave is selected to be 3, since 6 node portions generated in the vibrating member are formed along the circumferential direction, the load portions positioned to the node portions may be formed at 2 places, 3 places, or 6 places.

In other words, the number of load portions positioned to the node portions is equal to a common divisor or an integral multiple of the node number during generation of the standing wave. That is to say, a relationship between the number of load portions provided along the circumferential direction and the number of node portions when the standing wave is generated is defined by at least 1 common divisor corresponding to a positive integer greater than 2. At the same time, the number of load portions corresponds to such a number by which 360 can be divided of the number of load portions is equal to a number which can be evenly divided by 360.

Also, since the load portions are formed on the moving member 2, the moving member 2 has elasticity against the sliding surface along the vertical direction. As a result, since an overall surface of the comb-like projection portion 3a of the vibrating member can be in contact with the slide surface of the moving member 2, the stable drive state, or stable stop condition can be achieved.

FIG. 9 is a comparison diagram between a rotational position of a load portion for the moving member and a current waveform when a traveling wave of the ultrasonic motor according to the first embodiment of the present invention is produced.

FIG. 9(a) represents a position of the load portion of the moving member during rotation of this moving member, which is measured by a noncontact-type displacement gate, whereas FIG. 9(b) indicates a current waveform when the load portion is positioned. In case that the moving member having the load portions is rotated at a constant speed by the traveling wave, an envelope of a crest value of a current waveform is periodically varied.

FIG. 10 is a table for representing a relationship among the division number of the electrode for the piezoelectric element employed in the ultrasonic motor according to the first embodiment of the present invention, the number of comb-like projection portions of the vibrating member, the number of load portions of the moving member, and the changing number of the envelope for the current wave generated in the moving member per one rotation of this moving member. As apparent from this table, there is a difference in the changing number of tile envelope of the current waveform produced during one rotation of the moving member 1, depending upon the division number of electrode for the piezoelectric element, the comb-like projection number of vibrating member, and the load portion number of the moving member while the moving member is driven by the traveling wave.

For instance, in case that the electrode dividing number of the piezoelectric element is 12, the comb-like projection number of the vibrating member is 22, and the load portion number of the moving member is 15, the wave number of the envelope-formed current generated per 1 rotation becomes 6. Further, when the electrode dividing number of the piezoelectric element is 12, the comb-like projection number of the vibrating member is 24, and the load portion number of the moving member is 10, the changing number of the envelope-formed current generated per one rotation becomes 30.

Otherwise, if the electrode dividing number of the piezoelectric element is selected to be 12, the comb-like projection number of the vibrating member is selected to be 24, the load portion number of the moving member is selected to be 18, the changing number of the envelope-shaped current generated per one rotation becomes 18.

That is to say, the rotation information, the positional information and the like of the ultrasonic motor can be controlled by utilizing the relationship between the current waveforms and the load portions of the moving member as represented in FIG. 9 and FIG. 10.

Figure 11:
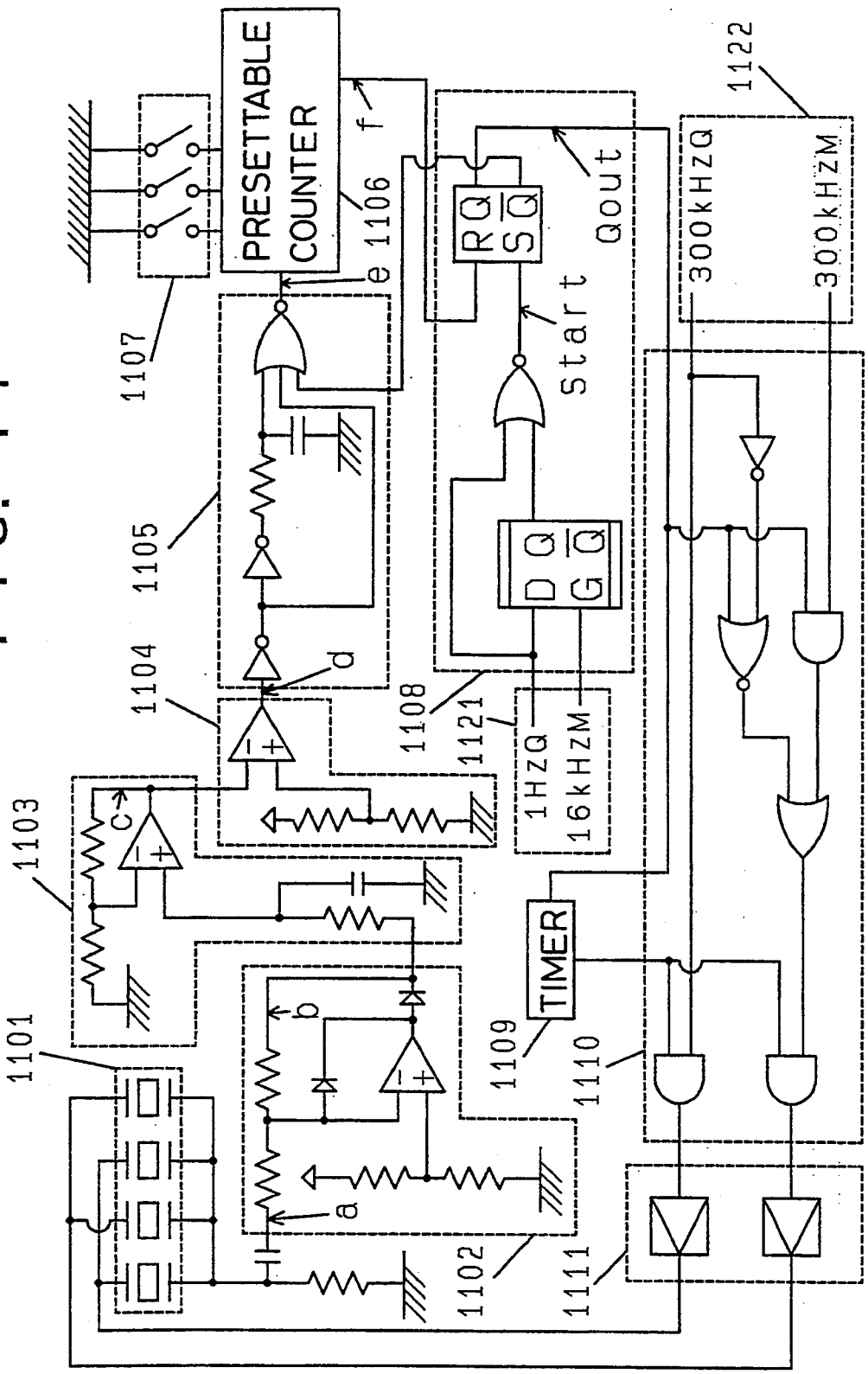
FIG. 11 is a circuit diagram of the ultrasonic motor according to the first embodiment of the present invention.

FIG. 11 shows a circuit diagram of the ultrasonic motor according to the first embodiment of the present invention. In FIG. 11, a rectifier/amplifier circuit 1102 rectifies an output signal of a piezoelectric vibrator 1101 and then amplifies the rectified signal. A smoothing circuit 1103 receives an output signal from the rectifier/amplifier circuit 1102 to smooth this signal. A judging circuit 1104 compares an output signal from the smoothing circuit 1103 with a preselected voltage value Vcomp to detect the rotation condition of the moving member. A rising detecting circuit 1105 receives an output signal from the judging circuit 1104 to detect a rising signal.

A presettable counter 1106 sets the output number of drive signal for the traveling wave by a switch 1107. A drive pulse generating circuit 1108 controls the output of the drive pulse by inputting output signals of 1 HzQ and 16 HzM of the dividing circuit 1121.

A timer 1109 sets the output time of the traveling-wave output signal and "the standing-wave output signal, and also the time during which both of the traveling-wave output signal and the standing-wave output signal are not outputted. An output pulse selecting circuit 1110 selects to output the traveling-wave output signal and the standing-wave output signal by inputting signals of 300 kHzQ and 300 kHzM outputted from the pulse generating circuit 1122.

It should be noted that the Q signal and the m signal are such signals whose phases are shifted by 90°. The signals of 300 kHzQ and 300 kHZM outputted from the pulse generating circuit 1122 are selected to be different values, depending upon the structures and designs of the ultrasonic motors. A piezoelectric vibrator driving circuit 1111 outputs an output signal for driving the piezoelectric vibrator 1101 by inputting either the traveling-wave output signal, or the standing-wave output signal.

Figure 12:
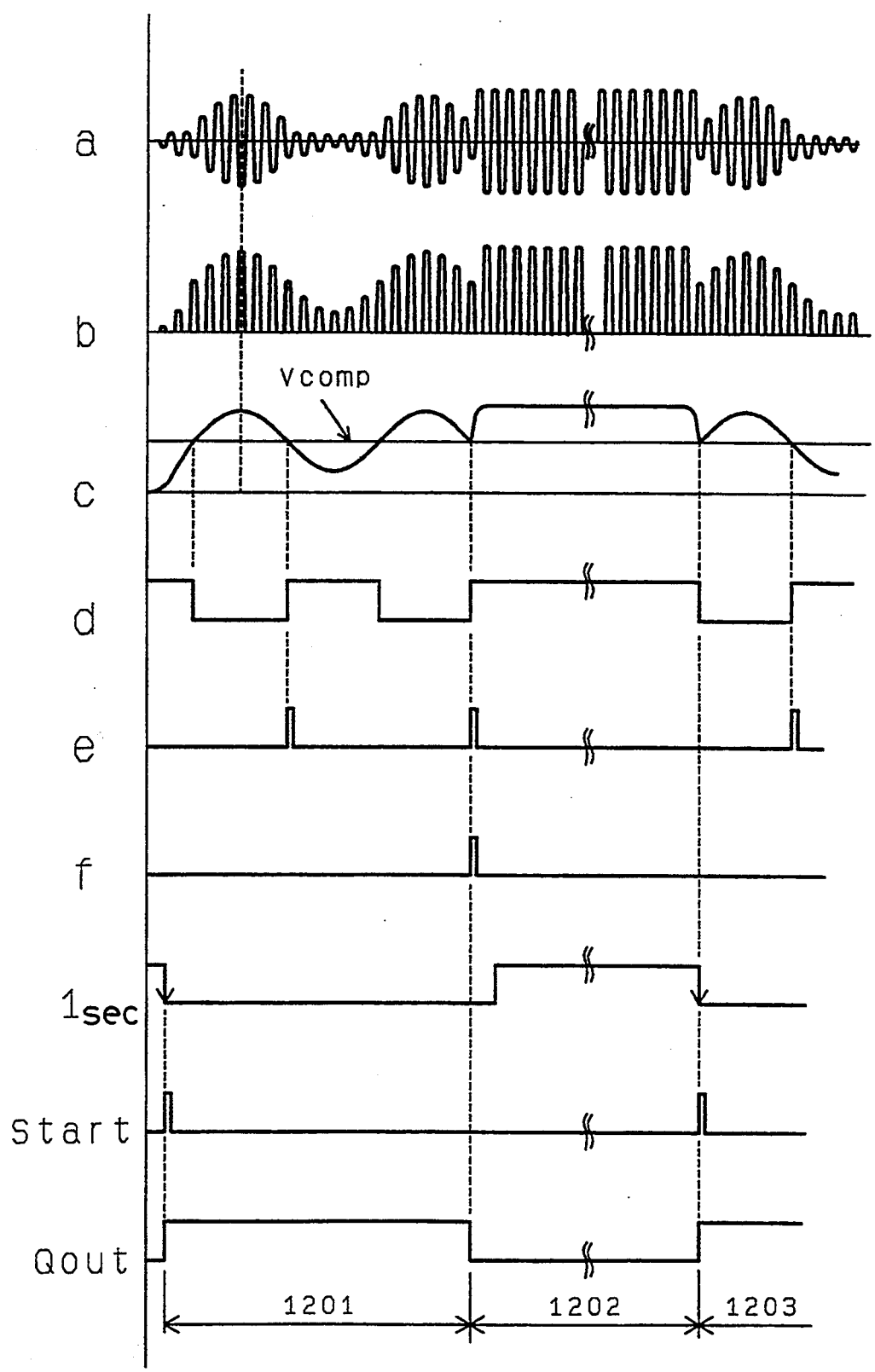
FIG. 12 is a timing chart for showing operations of the ultrasonic motor according to the first embodiment of the present invention.

FIG. 12 is a time chart for explaining various operations of the ultrasonic motor according to the preferred embodiment 1 of the present invention. In FIG. 12, symbols "a", "b", "c", "d", "e", "f", "Start" and "Qout" represent waveforms of signals appearing at the respective points corresponding to the points in the circuit diagram of the ultrasonic motor shown in FIG. 11, to which the same symbols have been given.

The signal "a" outputted from the piezoelectric vibrator 1101 is rectified and amplified, thereby becoming a signal "b". This signal "b" is smoothed to produce a signal "c". The signal "c" is compared with a preset voltage value "Vcomp" to obtain a signal "d". At the timing of this signal "d", a signal "e" inputted to the presettable counter 1106 is outputted.

The presettable counter 1106 outputs a signal "f" at a predetermined timing by operating the switch 1107. In response to the signal "f" and a signal "Start", a signal "Qout" is outputted.

The outputs of the traveling wave and the standing wave are controlled at such timings as shown in FIG. 12.

During a period or timing section 1201 shown in FIG. 12, the traveling wave is outputted, and during a period 1202, a standing wave is produced. During another period 1203, the traveling wave is again outputted. These periods, or timing sections 1201, 1202 and 1203 are set to preselected values by way of the timer 1109.

It should be noted that a rest period during which neither the standing wave, nor the traveling wave is outputted, may be set at either an interval period between the period 1201 and the period 1202, or another interval period between the period 1202 and the period 1203. Since such a rest period is newly set, there is such an advantage that the adverse influences of the previously outputted signal, e.g., residual vibrations can be simultaneously reduced when the output of either the traveling wave, or the standing wave is switched.

An ultrasonic motor capable of rotating an output shaft at a preselected angle within a constant time, may be realized by setting the set value of the timer to various values.

Second Embodiment

An ultrasonic motor, according to a second embodiment of the present invention, is so contrasted that the switching timings between an occurrence of a driving traveling wave and an occurrence of a stopping standing wave are performed without employment of the current detection.

Figure 13:
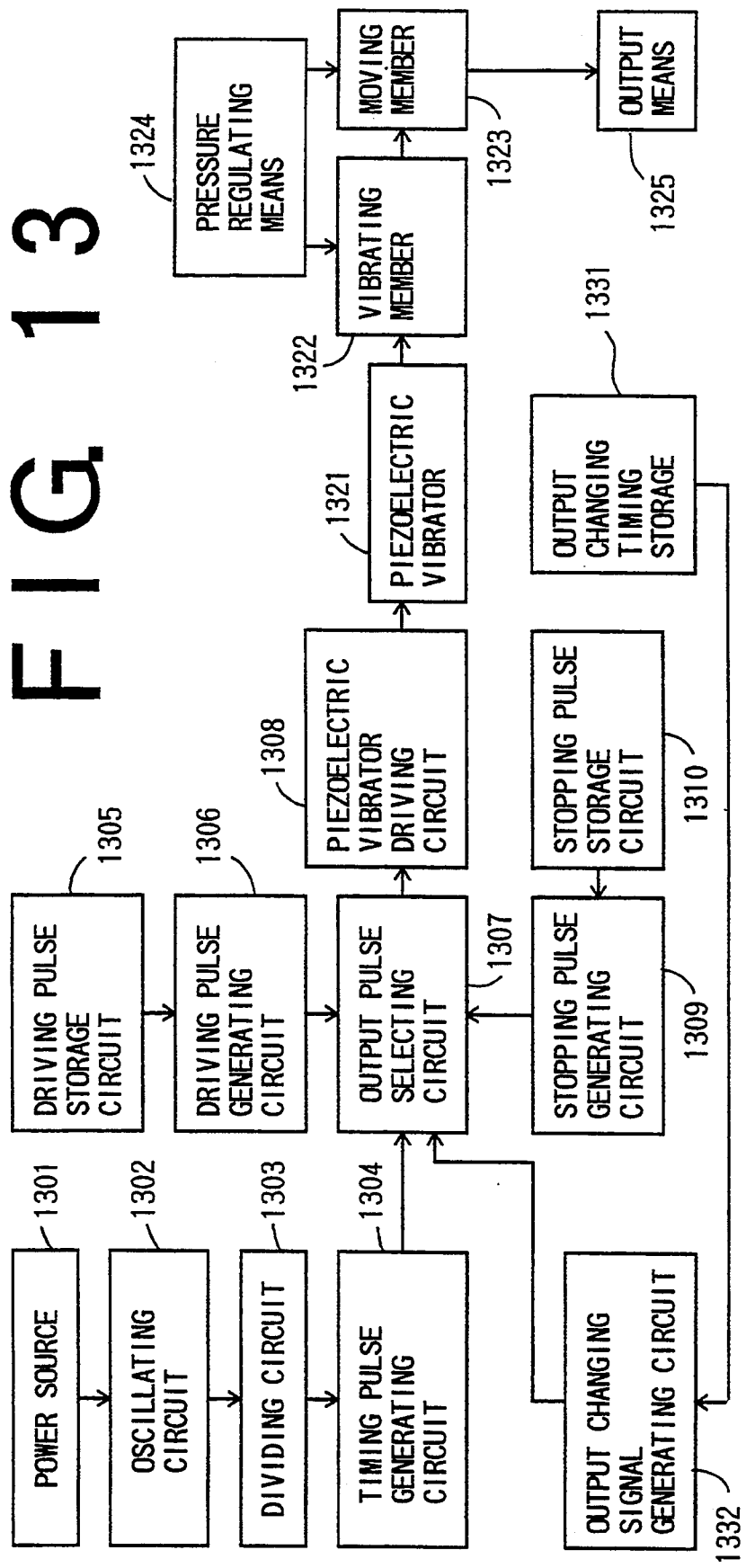
FIG. 13 is a system block diagram of another ultrasonic motor according to a second embodiment of the present invention.

FIG. 13 is a system block diagram of the ultrasonic motor according to the second embodiment of the present invention. In FIG. 13, an output changing timing storage circuit 1331 stores predetermined changing timings for the drive pulse and the stop pulse.

An output changing signal generating circuit 1332 generates changing timing signals for the drive pulse and the stop pulse by inputting the output signal of the output changing timing storage circuit 1331.

An output pulse selecting circuit 1307 controls an operation to output an output pulse to a piezoelectric vibrator driving circuit 1308 by inputting therein an output signal from a driving pulse generating circuit 1306, an output signal from a stopping pulse generating circuit 1309, and an output signal from an output changing signal generating circuit 1332. The piezoelectric vibrator driving circuit 1308 applies a predetermined high-frequency voltage to a piezoelectric vibrator 1321. An ultrasonic vibration occurs at a vibrating member 1322. A moving member 1323 executes such an operation as a rotation, which has a plurality of load portions used to stop the moving member when the standing wave is generated. A pressure regulating means 1324 give constant pressure to both of the vibrating member 1322 and the moving member 1323. An output means 1325 is operable in response to the operation of the moving member 1323.

Third Embodiment

An ultrasonic motor according to a third embodiment of the present invention, is so constructed that with respect to the moving member and the vibrating member shown in the first embodiment, the comb-like projection portions of the vibrating member are arranged above the node portions of the stopping standing wave.

Figure 14A:
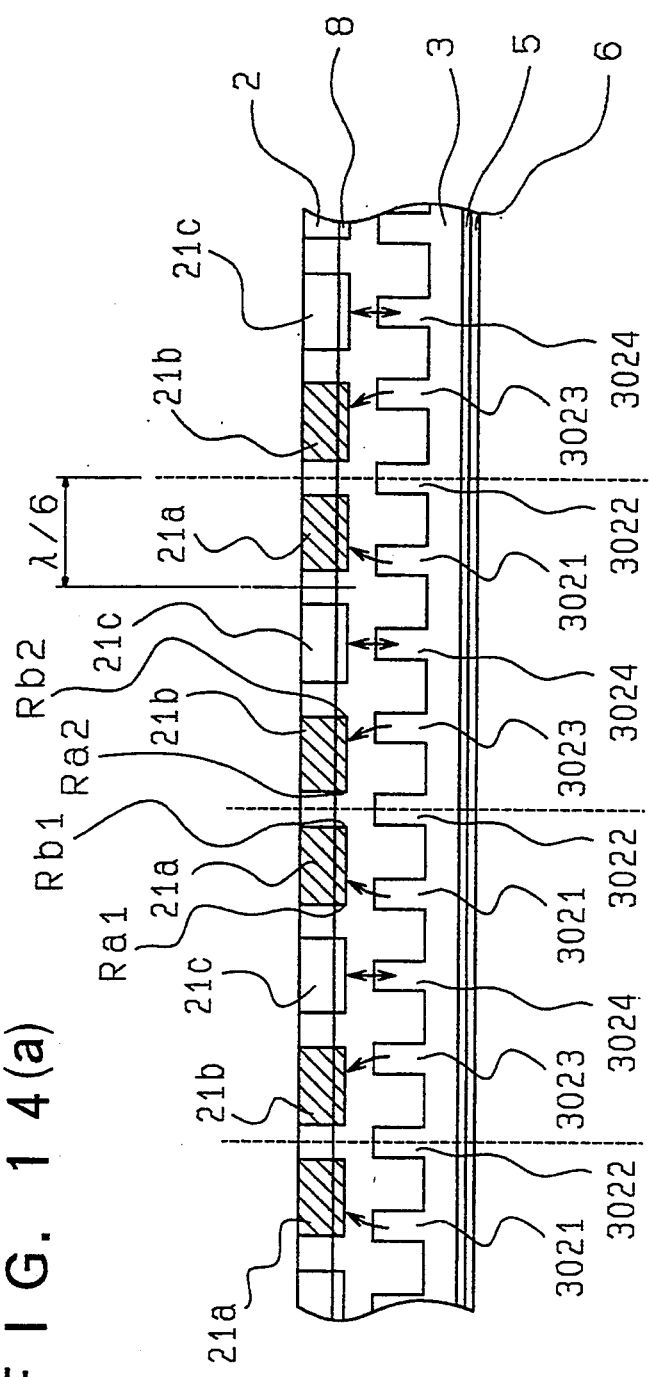
FIG. 14 is a sectional view for representing stop conditions/vibration conditions of another ultrasonic motor according to a third embodiment of tile present invention.
Figure 14B:
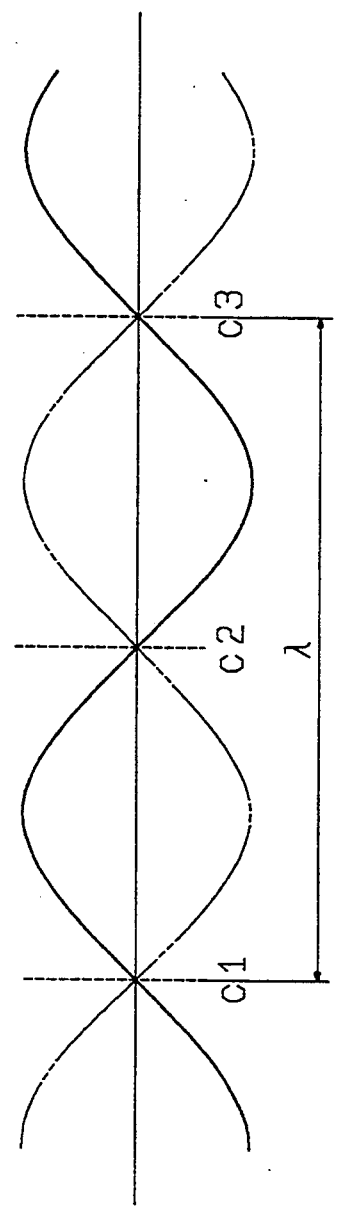

FIG. 14 is a sectional view for representing a stopping condition and a vibrating condition of the ultrasonic motor according to the third embodiment. In this case, the load portions of the moving member 2 are formed in an equiinterval by $\lambda/6$, which is similar to those of the first embodiment. 8 comb-like projection portions of the vibrating member are arranged with respect to a single standing wave, and also arranged at the node positions of the standing wave.

In FIG. 14, when the operation of the piezoelectric vibrator 5 is stopped and then, the piezoelectric vibrator 6 for producing the stopping standing wave is energized, as shown in FIG. 14, the standing waves are generated at the vibrating member 3 in such a manner that nodes of these standing waves are present at c1, c2, c3. At this time, forces are exerted at the comb-like projection portions 3012 to 3024 of the vibrating member 3 along an arrow direction. At this time, when there is unbalance in the force exerted on the side lower end portions $R_{a1}$, $R_{b1}$ and $R_{a2}$, $R_{b2}$ of the load portions of the moving member 2, the moving member 2 is rotated.

However, when the moving member 2 reaches a position as shown in FIG. 14, such a relationship is established that the projection portion 3021 is located under the lower end portion $R_{a1}$ of the load portions 21a, and the projection portion 3023 is located under the side lower end portion $R_{b2}$ of the load portions 21b. At this time, forces are exerted from both sides of the load portions 21a and 21b to both sides of the side lower end portions $R_{a1}$ and $R_{b2}$ toward an inside of the load portions 21a and 21b. The load portions 21a and 21b are positioned at the node portions of the standing waves where these forces are balanced.

Also, when the standing wave is generated, since the comb-like projection portion 3022 of the vibrating member is positioned at the node portion of the standing wave, and the projection portion 3024 is located at the node portion of the standing wave, no force to drive the load portions 21c is produced. As a consequence, the moving member 2 is positioned by the load portions 21a and 21b when the standing wave is produced.

Figure 15:
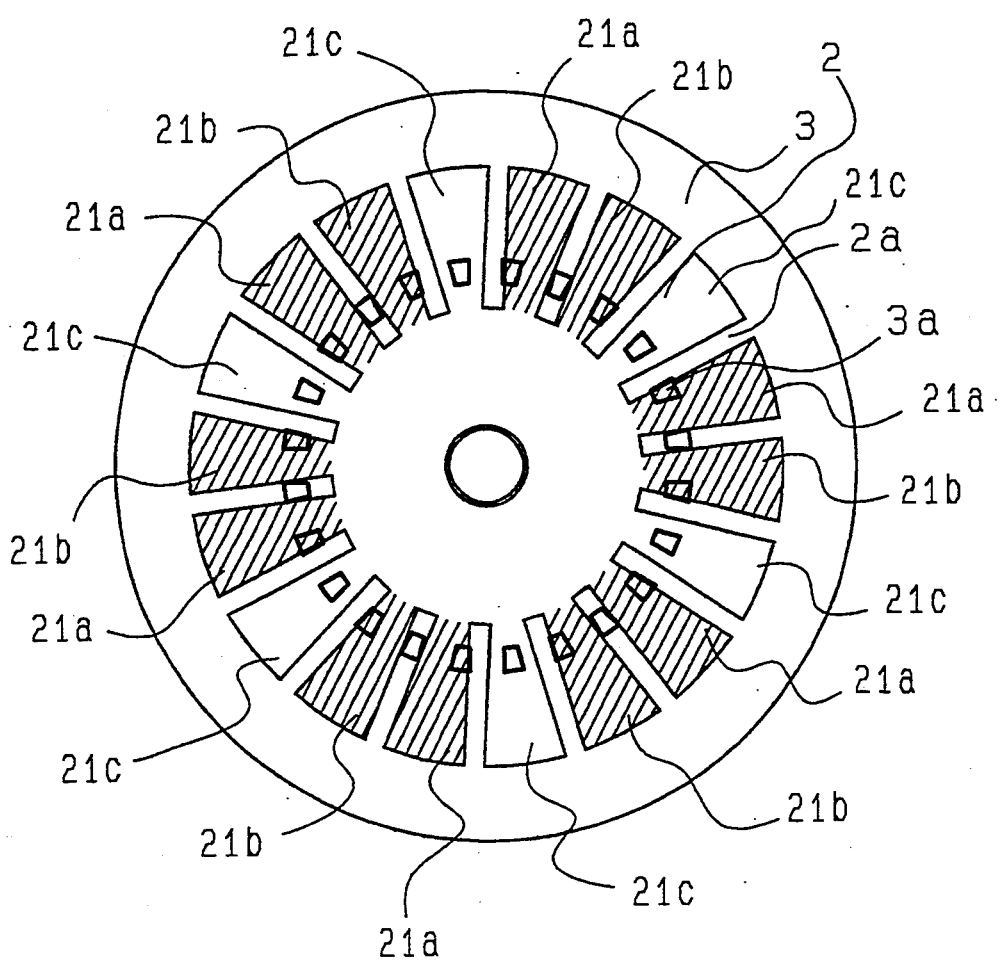
FIG. 15 is a fluoroscopic view of showing the vibrating member/moving member of the ultrasonic motor according to the third embodiment of the present invention.

FIG. 15 is a fluoroscopic diagram for showing the vibrating member and the moving member of the ultrasonic motor according to the third embodiment of the present invention, and symbols shown in this drawing correspond to those of FIG. 14.

In FIG. 15, the wave number of the standing wave is 3, and there is shown a positional relationship between the vibrating member and the moving member when the standing wave is generated. 6 load portions 21a and 21b which are positioned to the node portion of the standing wave are formed along the circumferential direction, and the minimum stepping angle of the moving member 2 becomes 20 degrees by switching the drive condition shown in FIG. 4 and the stop condition shown in FIG. 14. This condition is similar to that of the first embodiment, but since the positional relationship between the node portion of the standing wave and the comb-like projection portion of the vibrating member is different from that of the first embodiment, the stopping position of the moving member 2 is also different therefrom.

Fourth Embodiment

An ultrasonic motor according to a fourth embodiment of the present invention is so arranged that with respect to the moving member and the vibrating member in the first embodiment, a single piezoelectric vibrator is employed and two different sorts of standing waves are generated.

FIG. 16 is a diagram for explaining an operation of the ultrasonic motor according to the fourth embodiment of the present invention.

In FIG. 16, a single piezoelectric vibrator 4 having a plurality of subdivided electrode patterns 4a, 4b, 4c and 4d is connected to the vibrating member 3 by means of an adhesive agent. It should be noted that signs + and − shown in FIG. 16 indicate the polarization direction of the respective electrode pattern portions. In this preferred embodiment, as shown in this figure, electrode patterns 4a, 4b, 4c and 4d in which 2 pairs of electrode patterns such as +, +, −,− have been polarized-processed along the same direction, have been formed. When high-frequency voltage signals having the same phase are applied to the electrode patterns 4a, 4b, 4c and 4d under this condition, as indicated in FIG. 16(b), such standing waves are generated that b1, b2, b3 are node portions in the vibrating member 3. As previously explained in the first embodiment, the ultrasonic motor is operated in such a manner that a center portion of the load portion 21a is stopped at a position coincident with a center of the node portion.

Figure 16A:
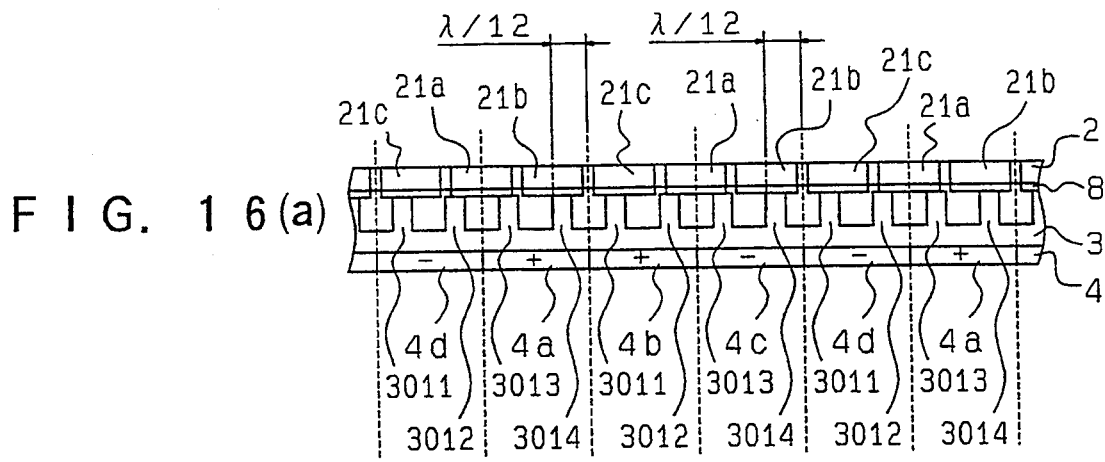
FIG. 16 is a sectional view/explanatory diagram of operations of an ultrasonic motor according to a fourth embodiment of the present invention.
Figure 16B:
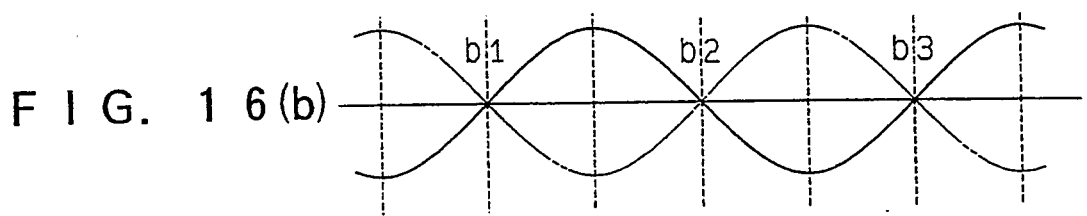
Figure 16C:
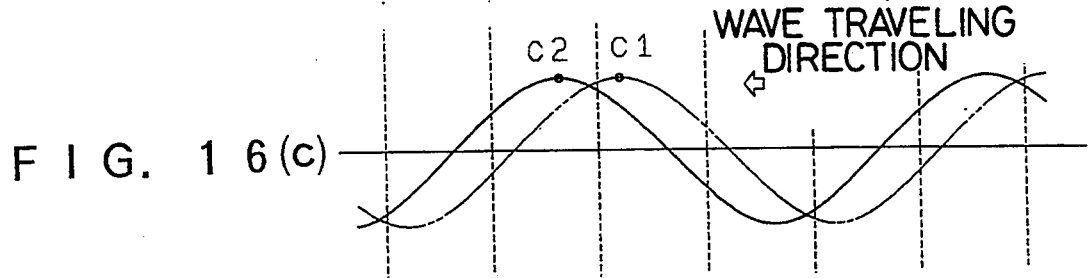
Figure 16D:
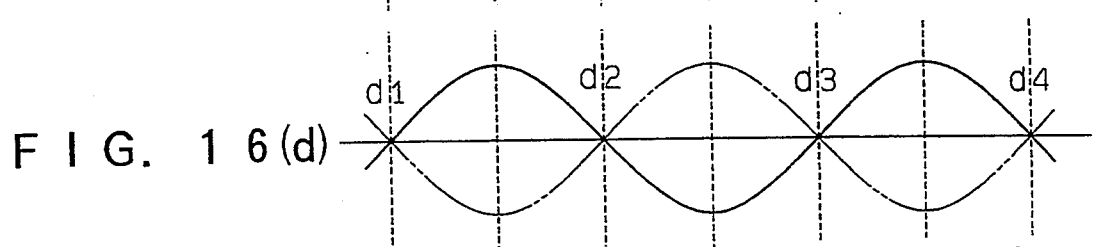
Figure 16E:
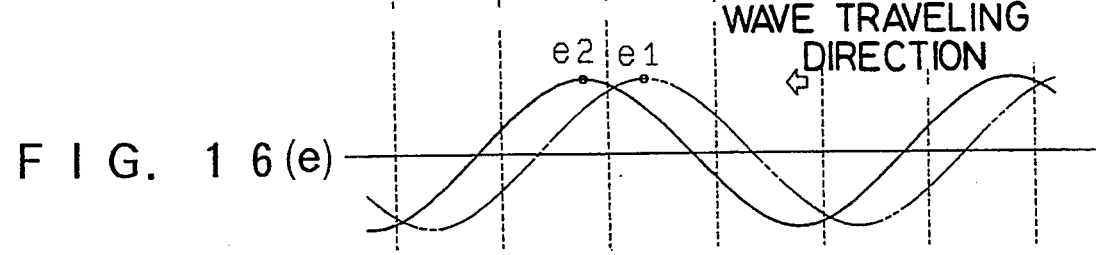

Subsequently, when high-frequency voltage signals having phases different from each other by 90 degrees are applied to the electrode patterns 4b and 4d with regard to the electrode patterns 4a and 4c, as shown in FIG. 16(c) the standing waves which are propagated from c1 to c2 are energized in the vibrating member 3. Then, the moving member 2 having a plurality of load portions is operated to be transported along a direction opposite to the wave propagating direction, as illustrated in FIG. 16(a). If the above-described operation is repeated, then the moving member may be stepwise driven in the $\lambda/6$ intervals, namely 20° intervals when the wave number of the standing wave is selected to be 3. A difference between this embodiment and the previously explained first embodiment and the second embodiment is given as follows. When high-frequency voltage signals having phases shifted by 180° are applied to the electrode patterns 4b and 4d with respect to the electrode patterns 4a and 4c, as indicated in FIG. 16(d), a standing wave having node portions at d1 to d4 is generated in the vibrating member 3, and the load portions 21b shown in FIG. 16(a) can be stopped at such a position that the moving member 3 is coincident with d1 to d4. Then, when high-frequency voltage signals having different phases by 90° are again applied to the electrode patterns 4b and 4d with respect to the electrode patterns 4a and 4c, a traveling wave is oscillated in such a manner that the wave is transferred from e1 to e2 in the vibrating member 3, as shown in FIG. 16(e) whereas the moving member 2 having a plurality of load portions as shown in FIG. 16(a) is operated in such a manner that this moving member 2 is transported along a direction opposite to the wave propagation direction. If the above-explained operation defined at FIGS. 16(b), 16(c), 16(d), 16(e), and 16b in this order is repeated, the stepping angle of the moving member 2 may be reduced by ½, as compared with the stepping angles of the first embodiment and the second embodiment. That is to say, if the wave number of the standing wave is selected to be 3, then a stepping angle of 10° may be realized. Also, when the size of the moving member is minimized, control of a very small stepping angle may be realized with less number of load portions.

Although the ultrasonic motor according to this preferred embodiment 4 has been so constructed by the electrode patterns for dividing 1 wavelength by 4, and by 24 comb-like projection portions of the vibrating member, it may be arranged such that the wave number of the vibration is selected to be "λ", "n" is selected to be a positive integer equal to one or more, the subdividing number of electrode pattern is selected to be "2nλ", and the number of projection portions for the vibrating member is equal to a value obtained by multiplying the subdividing number of the electrode pattern for the piezoelectric vibrator by an integer. Furthermore, if "n" is selected to be more than 1, then control of a further smaller stepping angle may be realized.

Figure 17:
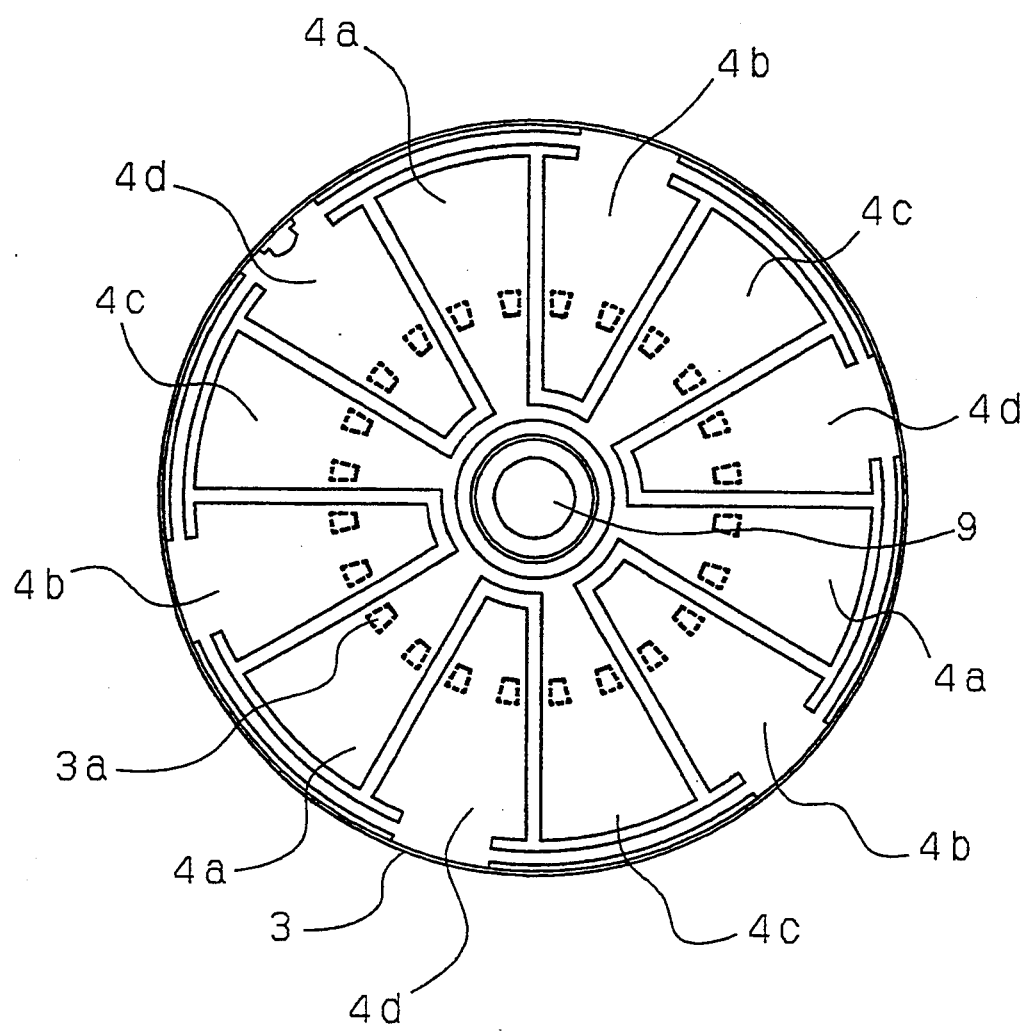
FIG. 17 is a plan view for showing electrode patterns of the piezoelectric vibrator employed in the ultrasonic motor according to the fourth embodiment of the present invention.

FIG. 17 is a plan view for representing the electrode patterns of the piezoelectric vibrator employed in the ultrasonic motor according to the fourth embodiment of the present invention. Since one wavelength is constructed of 4 divided electrode patterns and 3 waves can be oscillated along the circumferential direction, the ultrasonic motor according to this preferred embodiment has 12 divided electrode patterns. Accordingly, in principle, 12 lead-wire connections are required. When the piezoelectric vibrator is made compact, there is a problem that when a large number of lead wires would be mounted, the vibrations are suppressed, resulting in lowering performance of this ultrasonic motor. Thus, according to this preferred embodiment, only two lead wires are required by forming the shortcircuit electrode patterns every 1 electrode pattern with employment of the polarizations-processed electrode patterns by +, +, −, − in this order at the inner peripheral and the outer peripheral of the piezoelectric vibrator 4.

Fifth Embodiment

An ultrasonic motor according to a fifth embodiment of the present invention is so constructed that the number of load portions of a moving member is reduced by ½, as compared with the number of load portions of the moving member shown in the fourth embodiment.

Figure 18:
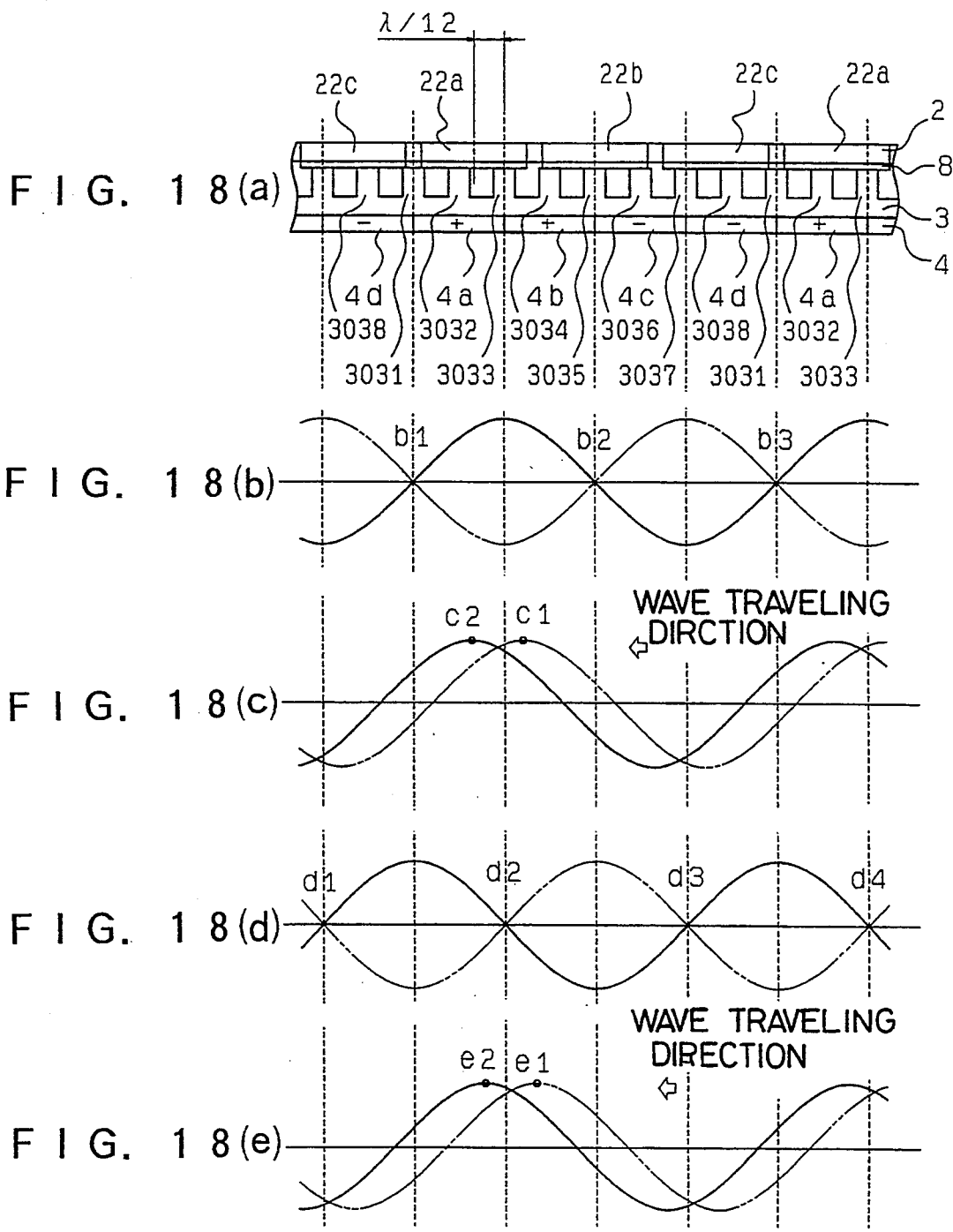
FIG. 18 is a sectional view and explanatory diagram for showing operations of an ultrasonic motor according to a fifth embodiment of the present invention.

FIG. 18 is a diagram for explaining operations of the ultrasonic motor according to the fifth embodiment of the present invention.

In FIG. 18, 9 load portions of the moving member 2 are formed which are equal to ½ of the number of load portions of the moving member shown in the fourth embodiment. The vibrating member 3 is constructed in such a manner that the projection portions are arranged over the node portions b1, b2, b3 and d1 to d4 of the stopping standing waves (b) and (d).

When high-frequency voltage signals having the same phase are supplied to the electrode patterns 4a, 4b, 4c and 4d of the piezoelectric vibrator 4, and standing waves whose node portions appear at b1, b2, b3, as shown in FIG. 18(b), are produced at the vibrating member 3, a center portion of a load portion 22b is stopped at a position coincident with the node portion due to a balance in forces of the projection portions 3034 and 3036 of the vibrating member. However, the load portions 22a, 22c are not stopped at the position coincident with the node portion, and the forces of the projection portions 3032, 3038 of the vibrating member, which may be exerted onto the load portions 22a and 22c, are mutually canceled with each other. As a result, the moving member 2 is stopped due to an oscillation of the standing wave. Then, the traveling wave and two sorts of standing waves are repeated by (b), (c), (d), (e) and (b) in this order, so that a stepping angle of 10° can be realized even when there are nine load portions of the moving member.

Figure 19:
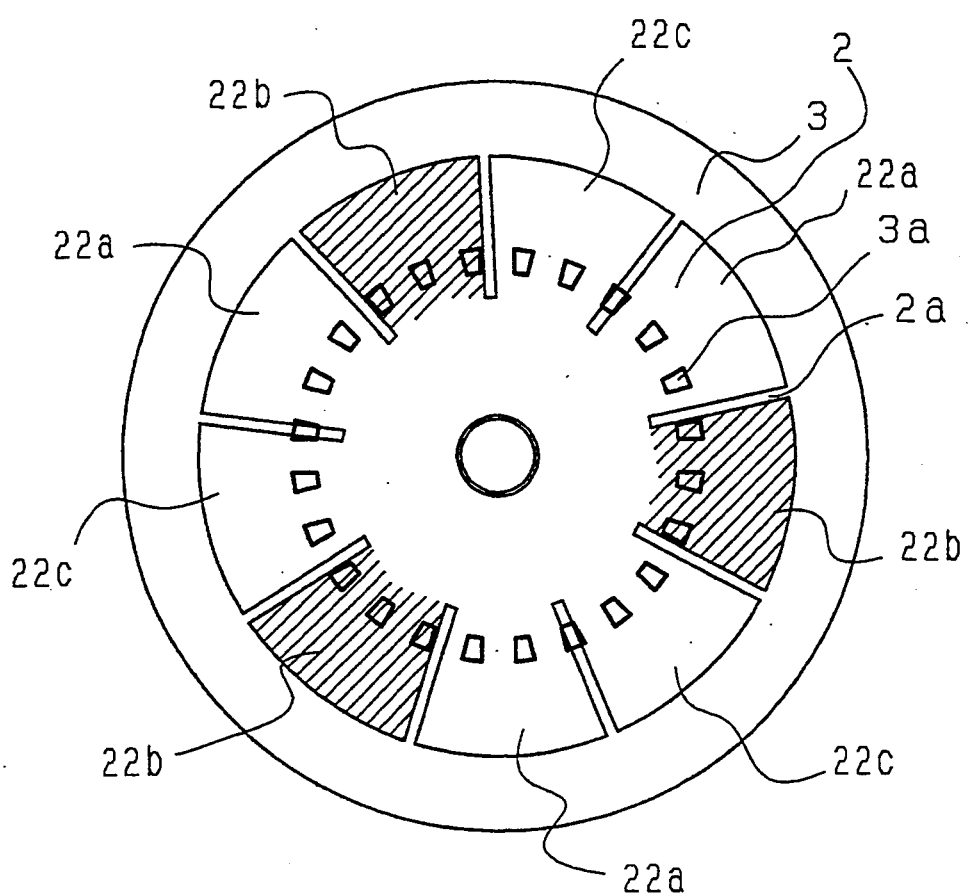
FIG. 19 is a fluoroscopic view of showing the moving member/vibrating member of the ultrasonic motor according to the fifth embodiment of the present invention.

FIG. 19 is a fluoroscopic diagram of the vibrating member and the moving member of the ultrasonic motor according to the fifth embodiment of the present invention, and symbols shown in FIG. 19 correspond to those of FIG. 18. In FIG. 19, there is shown a positional relationship between the vibrating member and the moving member when the standing wave is oscillated. In this figure, there are formed 3 load portions which are positioned at the node portions of the standing wave along the circumferential direction. As a result, as compared with the fourth embodiment in which 6 load portions positioned at the node portions of the standing waves are formed along the circumferential direction, although there are some possibilities that the magnitude of holding torque of the moving member 2 is varied during generation of the standing waves, in the ultrasonic motor according to the fifth embodiment, which is minimized, such a control for a very small stepping angle can be realized at a further less number of load portions.

Sixth Embodiment

An ultrasonic motor according to a sixth embodiment of the present invention is so arranged that a minimum stepping angle is set to 6°.

Figure 20:
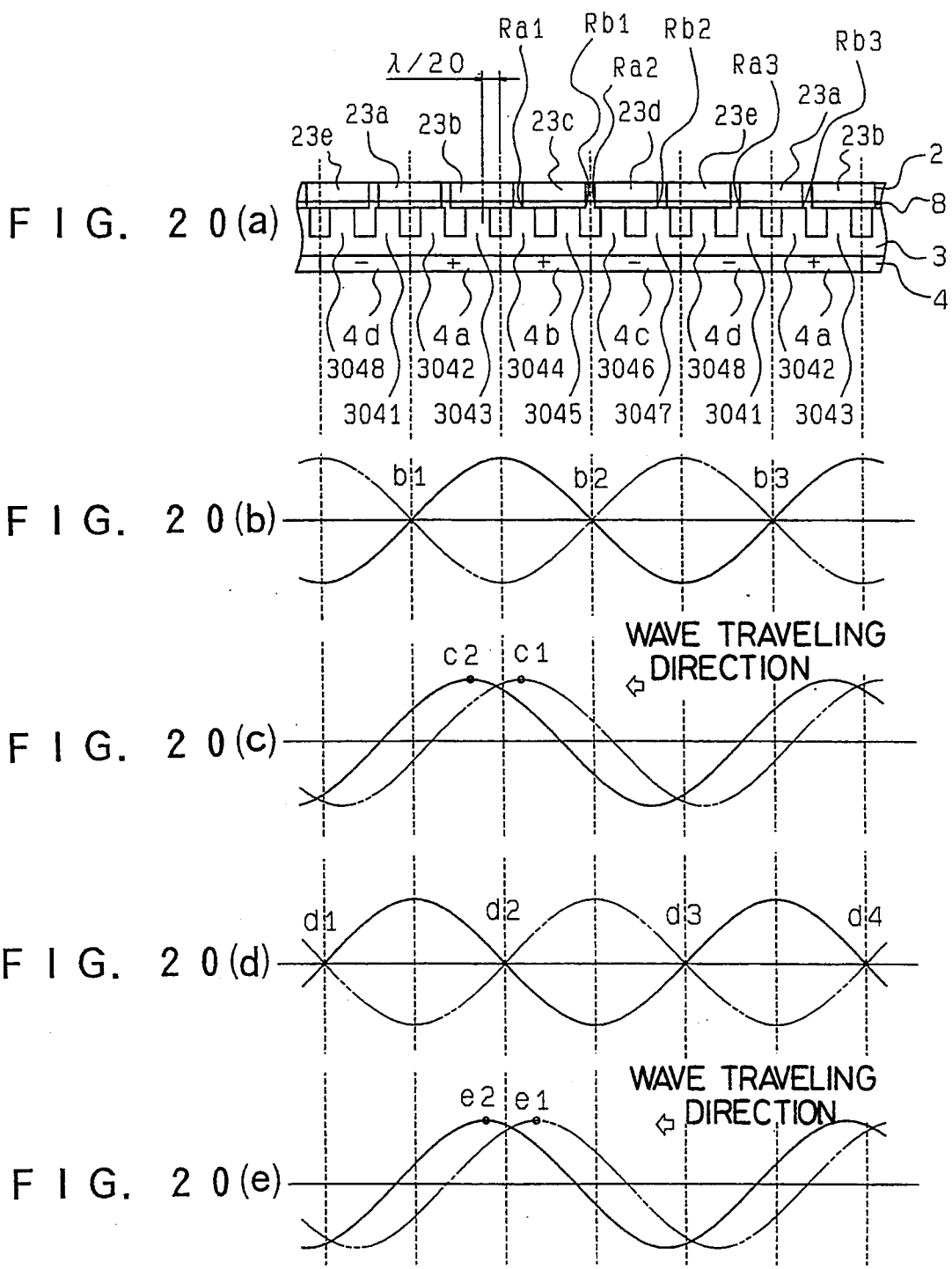
FIG. 20 is a sectional view/explanatory diagram for showing operations of an ultrasonic motor according to a sixth embodiment of the present invention.

FIG. 20 is an explanatory diagram of an operation of the ultrasonic motor according to the sixth embodiment of the present invention. In FIG. 20, the wave number of the standing waves is 3. 15 load portions of the moving member 2 are formed in equiinterval condition (namely, intervals of 24°). The vibrating member 3 is so constructed that the projection portions are located apart from the node portions b1, b2, b3 and d1 to d4 of the stopping standing waves (b) and (d).

When high-frequency voltage signals are supplied to the electrode patterns 4a, 4b, 4c and 4d of the piezoelectric vibrator 4 to generate such a standing wave whose node portions are present at b1, b2, b3, as shown in FIG. 20(b), in the vibrating member 3, the load portion 23a is positioned above the node portions b1, b3 by exerting the forces from both sides of the side lower edge portions $R_{a3}$ and $R_{b3}$ of the load portion 23a toward the inside, as indicated in the first embodiment. Also, as shown in the second embodiment, the load portions 23c and 23d are positioned above the node portion b2 by exerting the forces from both ends of the side lower edge portion $R_{a1}$ of the load portion 23c and the side lower end portion $R_{b2}$ of the load portion 23d toward the inside. Since the forces exerted on the load portions 23b and 23e are canceled with each other, no force to stop the load portions 23b and 23e is exerted on the load portions 23b and 23e. Accordingly, the moving member 2 is stopped by the oscillation of the standing wave as shown in FIG. 20(a).

When high-frequency voltage signals having phase shifts by 180° are supplied to the electrode patterns 4b and 4d of the piezoelectric vibrator 4 with respect to the electrode patterns 4a and 4c, thereby generating standing waves with node portions at places d1 to d4, as shown in FIG. 20(d), in the vibrating member 3, since the load portion 23b is positionally shifted from the node portion d1 by λ/20, namely 6 degrees, and also the load portions 23d, 23e are positionally shifted from the node portions d1 and d3, the stepping angle of 6 degrees can be realized by repeating the traveling wave and two sorts of standing waves indicated in FIG. 20, (b), (c), (d), (e) and (b) in this order.

Figure 21:
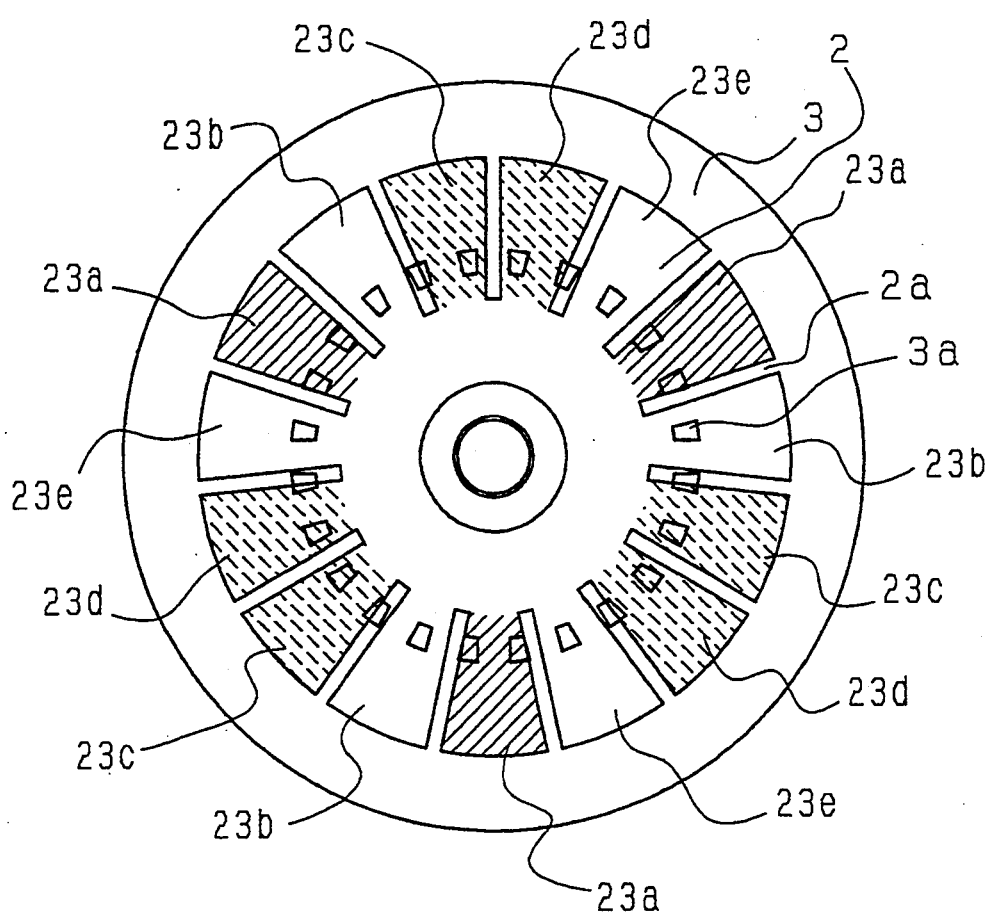
FIG. 21 is a fluoroscopic view for showing the vibrating member/moving member employed in the ultrasonic motor according to the sixth embodiment of the present invention.

FIG. 21 is a fluoroscopic view for the vibrating member and the moving member of the ultrasonic motor according to the sixth embodiment of the present inventions, and symbols shown in this drawing correspond to those of FIG. 20. In FIG. 21, there is shown a positional relationship between the vibrating member and the moving member when the standing waves are produced. Since 3 load portions which have been positioned to the node portions of the standing waves in a similar manner to that of the first embodiment and the second embodiment, are formed along the circumferential direction, namely 6 load portions in total, a very small stepping angle can be obtained with employment of a less number of load portions, and also a stable stepping drive control can be achieved.

Seventh Embodiment

An ultrasonic motor according to a seventh embodiment of the present invention is so constructed that the total number of load portions formed in the moving member shown in the sixth embodiment is further reduced, and a minimum stepping angle is 6 degrees.

Figure 22:
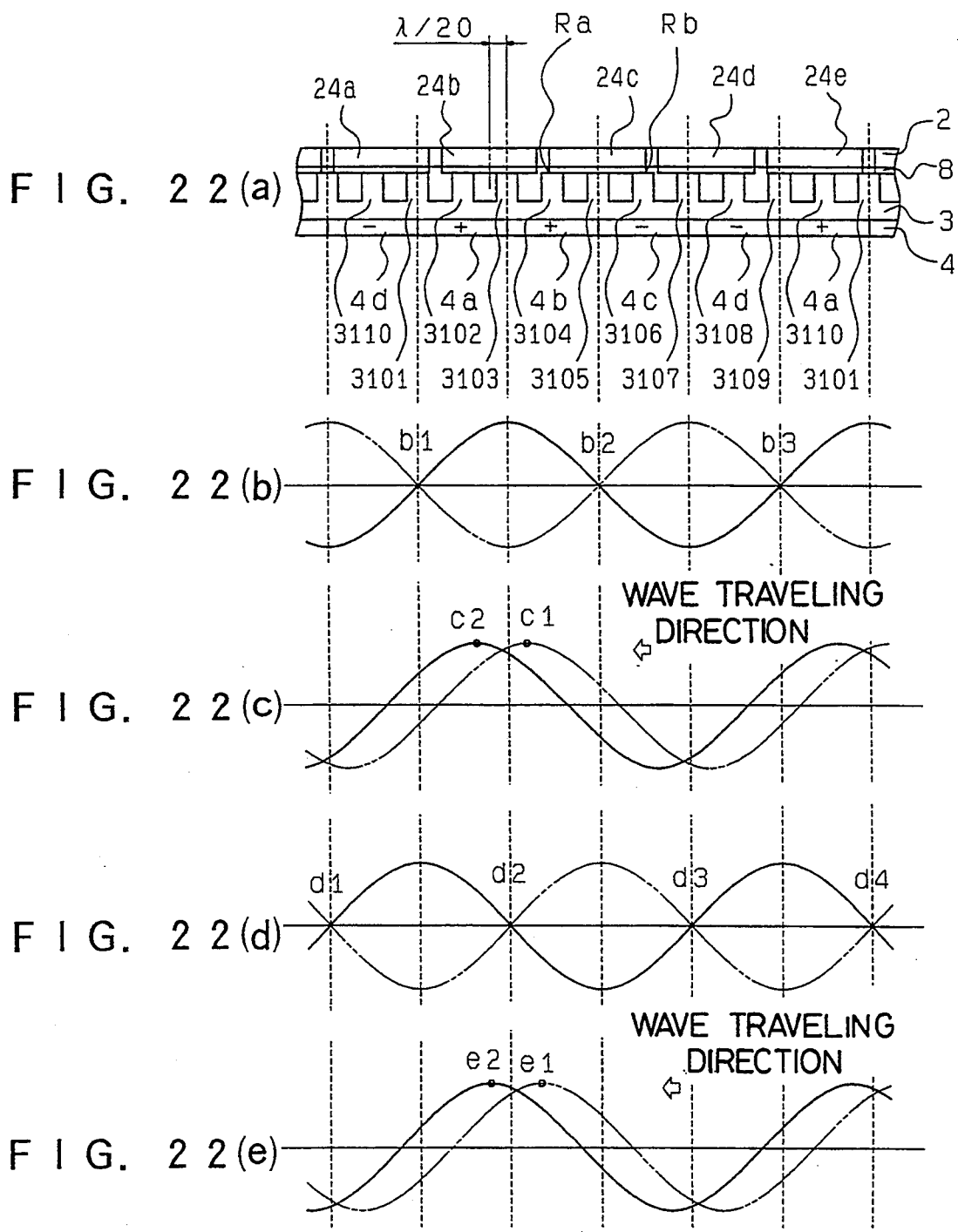
FIG. 22 is a sectional view/explanatory diagram of operations of another ultrasonic motor according to a seventh embodiment of the present invention.
Figure 23:
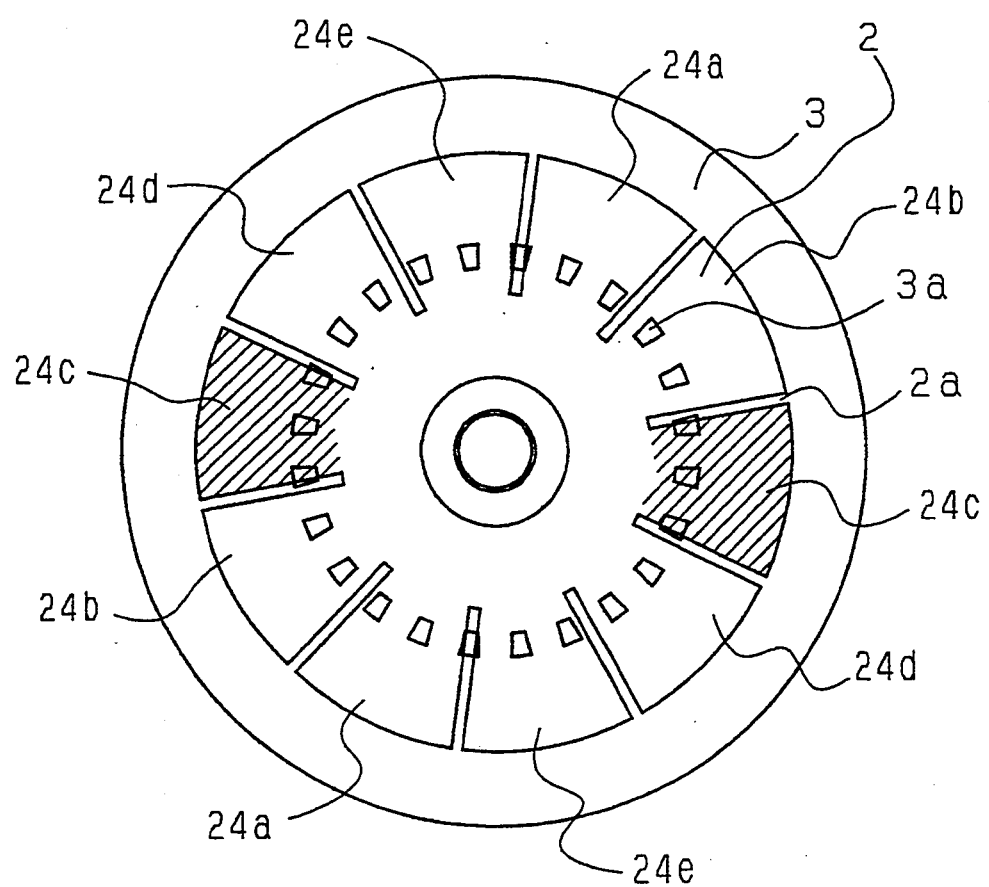
FIG. 23 is a fluoroscopic image of tile vibrating member/moving member of the ultrasonic motor according to the seventh embodiment of the present invention.

FIG. 22 is an explanatory diagram of operations related to the ultrasonic motor according to the seventh embodiment of the present invention. FIG. 23 is a fluoroscopic view of the moving member and the vibrating member employed in the ultrasonic motor according to the seventh embodiment of the present invention. Symbols shown in FIG. 23 correspond to those of FIG. 22. In FIG. 22, 10 load portions of the moving member 2 are formed in equiinterval, namely 36 degree-interval. The vibrating member 3 is arranged in such a manner that the projection portions are positioned over the node portions b1, b2, b3 and d1 to d4 of the stopping standing waves (b) and (d).

In case that high-frequency voltage signals having the same phase are applied to the electrode patterns 4a, 4b, 4c, 4d of the piezoelectric vibrator 4 to produce such standing waves at the vibrating member 3 that b1, b2, b3 are node portions as shown in FIG. 22(b), the load portion 24c is positioned over the node portion by forces exerted from both sides of side lower end portions Ra, Rb of the load portion 24c toward an inside thereof. As apparent from FIG. 23, 2 load portions 24c are formed along the circumferential direction, as shown by the hatched portions.

When high-frequency voltage signals having phase shifts by 180° are supplied to the electrode patterns 4b, 4d with respect to the electrode patterns 4a, 4b of the piezoelectric vibrator 4, and then such standing waves are produced at the vibrator 3 that node portions thereof are located at d1 to d4, as shown in FIG. 22(d), since the load portion 24b is located at a position shifted from the node portion d2 by 6°, the traveling wave and 2 sorts of standing waves are repeated in (b), (c), (d), (e), (b) in this order, so that the stepping angle of 6 degrees can be realized.

That is to say, as previously described with reference to the first seven embodiments, if there are at least two load portion spaces which have been positioned to the node portions by generating the standing waves, the stable stopping condition can be obtained when the standing waves are generated. Also, the maximum stepping number of the moving member per 1 rotation, which has the load portions used to step the moving member when the standing waves are generated, may be expressed by the minimum common multiple between the number of load portions provided on the moving member, and also a total number of node portions of the standing waves (for instance, when the node quantity of one sort of standing wave is 6, and two sorts of standing waves are switched to drive, a total number becomes 12). A value obtained by dividing 360° by this minimum common multiple becomes a minimum stepping angle. As a result, it is possible to obtain an arbitrary stepping angle by applying the above-explained relationship to each case.

Eighth Embodiment

An ultrasonic motor according to a eighth embodiment of the present invention is so constructed with another structure of the moving member having the load portions shown in the first embodiment.

FIG. 24 is an upper view of a moving member from which several load portions have been dropped. In FIG. 24, there is shown such a moving member 2 from which only 6 load portions have been dropped, as compared with the moving member of the first embodiment which has 18 load portions. Even in such a moving member, this moving member can be stopped until the load portions are positioned to the node portions when the standing waves are generated.

In other words, the moving member has the load portions fabricated in such a manner that a space between the successive load portions is in contact with at least 1 node portion when the standing waves are generated, so that the moving member can be stepwise driven at the minimum stepping angle. It should also be noted that either load portions can be formed by other intervals, or a means having no relationship with the moving member may be constructed within a range where no load portions is formed.

As apparent from the foregoing description, the present invention may be readily applied to a linear type ultrasonic motor.

Ninth Embodiment

Figure 25:
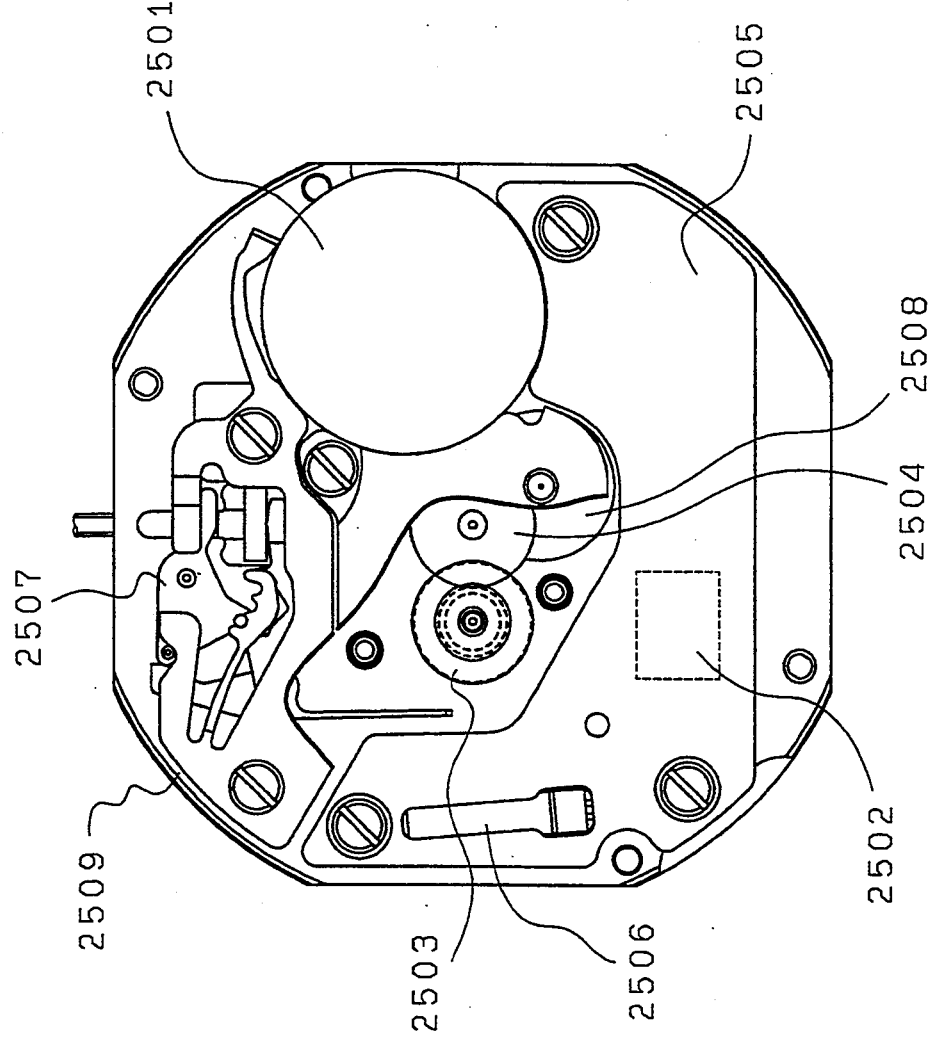
FIG. 25 is a plan view of an electronic apparatus equipped with an ultrasonic motor according to the present invention.
Figure 26:
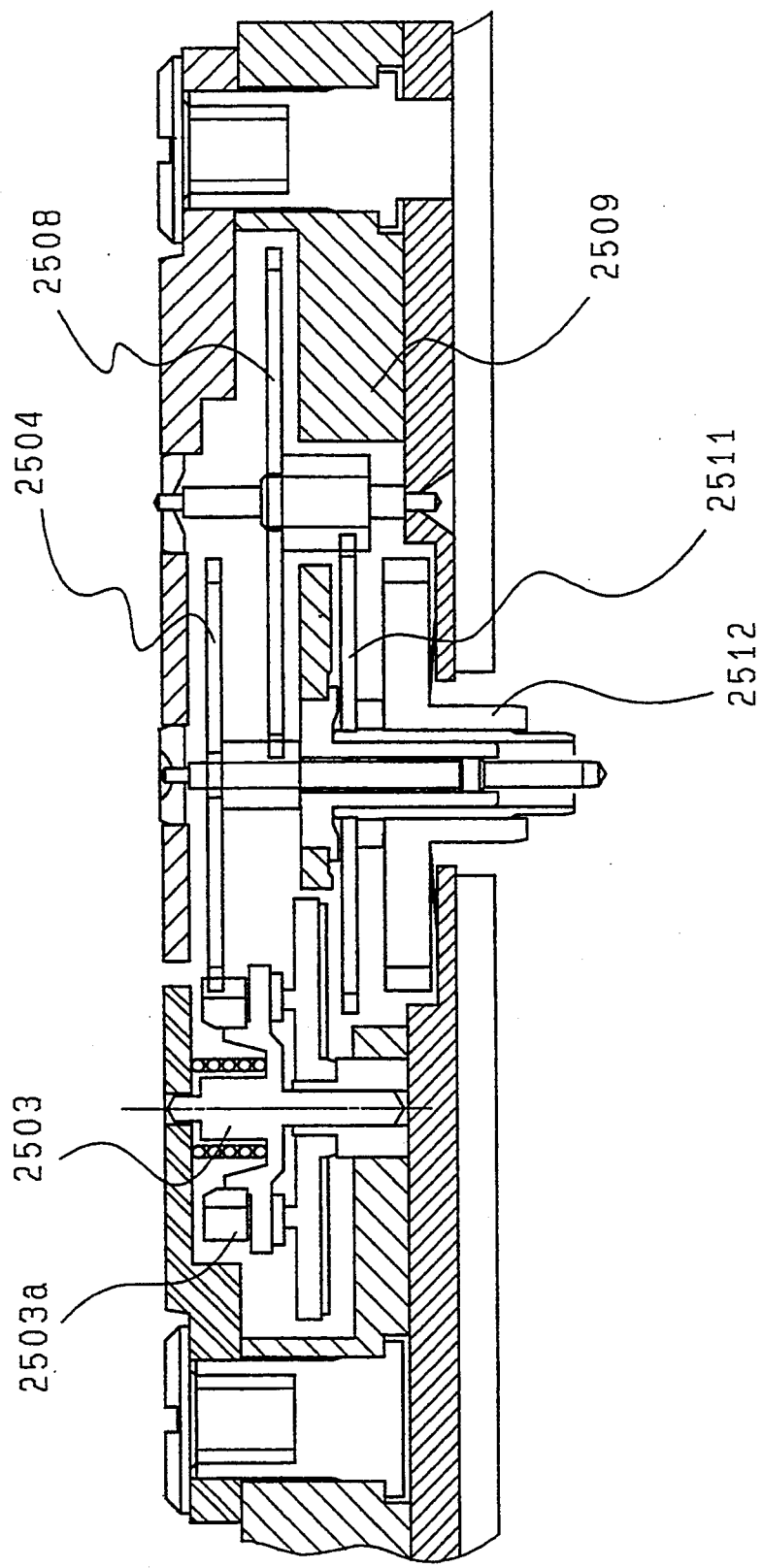
FIG. 26 is a partial sectional view of the electronic apparatus equipped with the ultrasonic motor according to the present invention.
Figure 27:
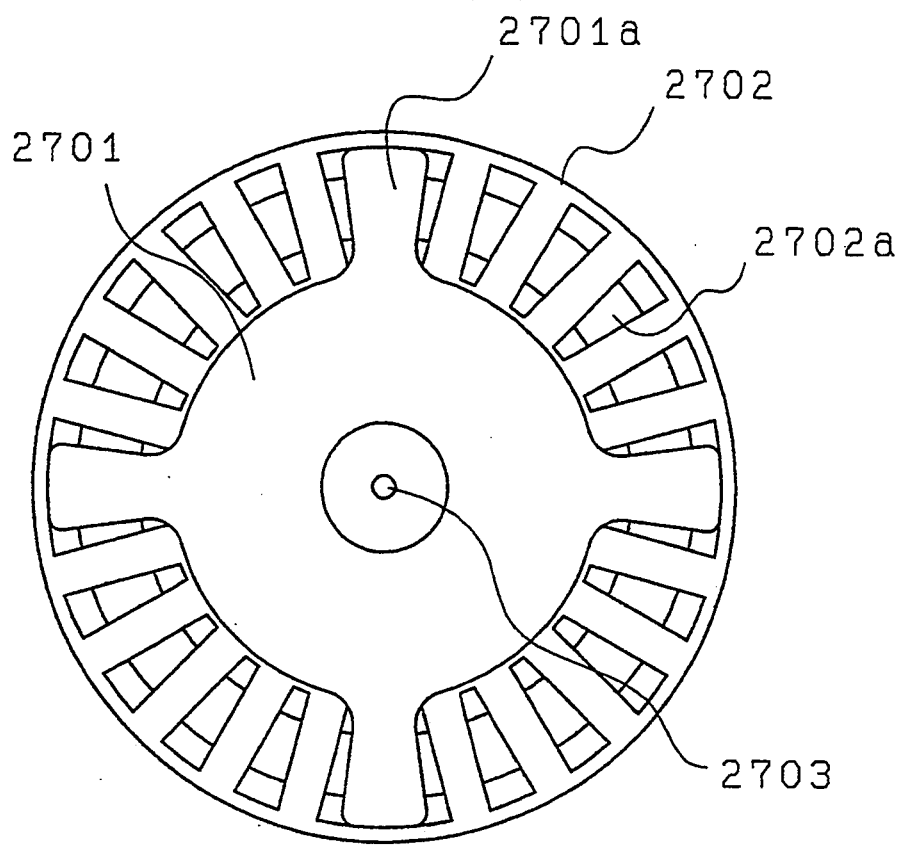
FIG. 27 is an upper view of a conventional ultrasonic motor.
Figure 28:
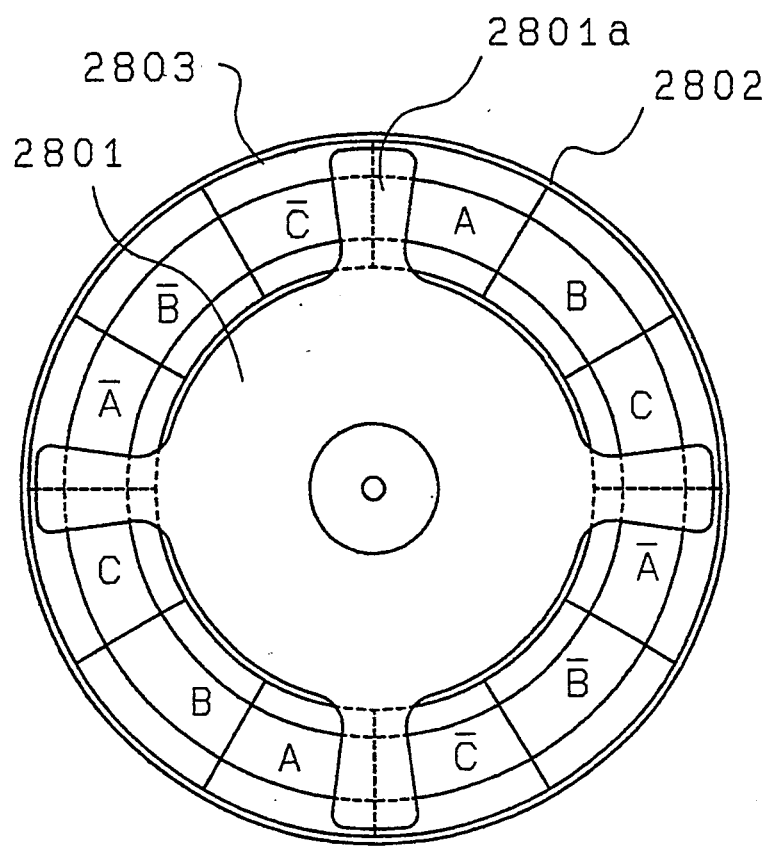
FIG. 28 shows a positional relationship between the electrode patterns of the piezoelectric vibrator and the moving member of the conventional motor.
Figure 29:
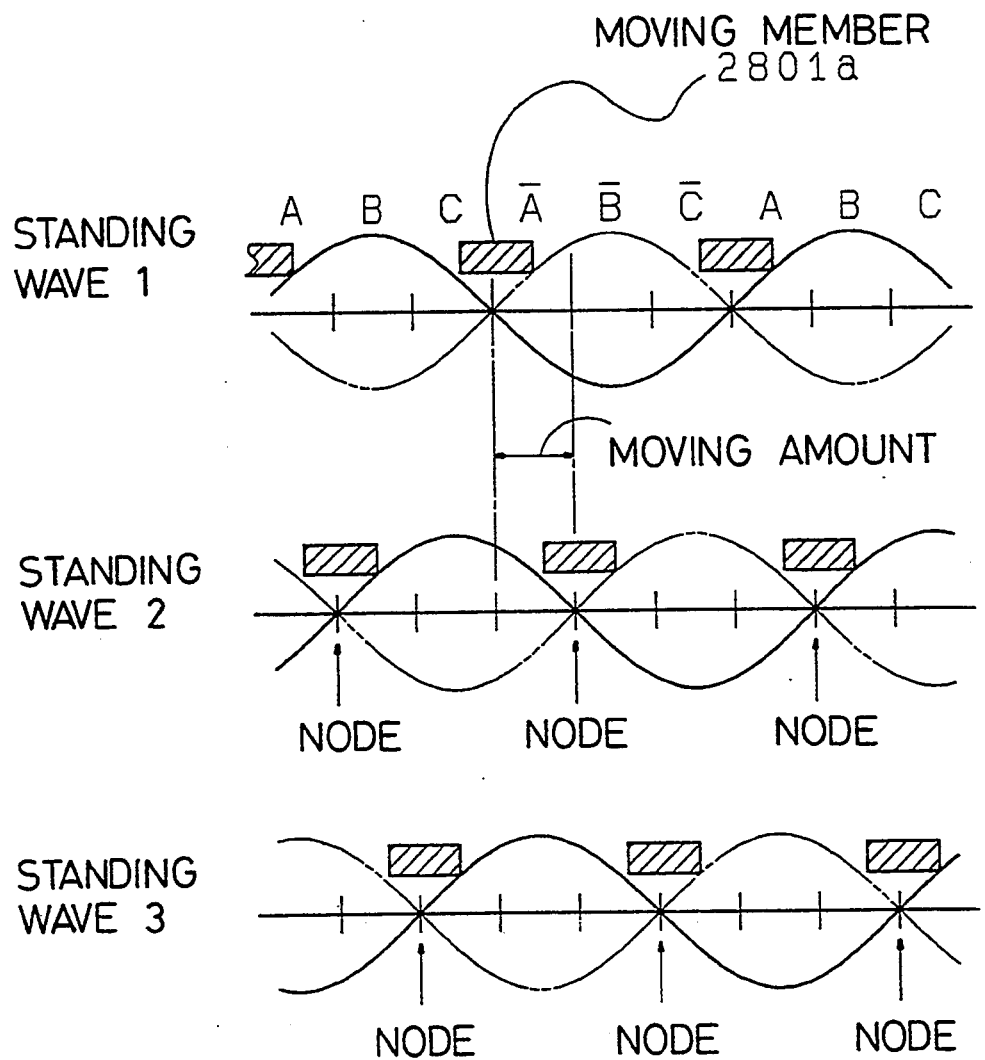
FIG. 29 is an explanatory diagram for showing vibration conditions of the conventional ultrasonic motor.

FIG. 25 is a plan view of an electronic apparatus equipped with an ultrasonic motor according to another preferred embodiment of the present invention. FIG. 26 is a partial sectional view for representing the electronic apparatus equipped with the ultrasonic motor according to this preferred embodiment of the present invention. FIG. 25 is a plan view for showing a mechanical structure in case of an analog electronic timepiece as the electronic apparatus equipped with the ultrasonic motor according to the preferred embodiment of the present invention. FIG. 26 is a sectional view of this mechanical structure.

In FIG. 25 and FIG. 26, a stepping lever 2507, a yoke a yoke holder and the like belonging to the stepping mechanism components are assembled into a main plate 2509. An integrated circuit 2502 is fixed to a circuit block 2505. A crystal oscillator 2506 is mounted on the circuit block 2505 and is used as an oscillating source. The integrated circuit 2502 is operable under a battery 2501.

The integrated circuit 2502 is provided with an oscillating circuit, a dividing circuit, and a timing pulse generating circuit. In response to the output signal from the timing pulse generating circuit, a predetermined drive pulse is outputted to the ultrasonic motor. The ultrasonic motor 2503 is rotated at a predetermined rotational speed and a preselected angle.

A gear of a moving member 2503a employed in the ultrasonic motor 2503 causes a second wheel 2504 to be rotated by 6 degrees per 1 second. A fifth wheel 2508 is rotated by the rotations of the second wheel 2504. A minute wheel 2511 is rotated by 6 degrees per 1 minute by the rotations of the fifth wheel 2508. An hour wheel 2512 is rotated by two turns per 1 day by the rotations of the minute wheel 2511 via a minute wheel (not shown in detail).

A time instant is indicated by an hour indicator (not shown) mounted on the hour wheel 2512, a minute indicator (not shown either) mounted on the minute wheel 2511, and a second indicator (not shown either) mounted on the second wheel 2504.

The integrated circuit 2502 has an output pulse changing circuit. The output pulse changing circuit supplies and interrupts the supply of a properly designed drive pulse, or a properly designed stop pulse.

Since the ultrasonic motor of the analog electronic timepiece equipped with the ultrasonic motor is firmly driven under the very small stepping operation, time instants can be correctly indicated. Also, since the ultrasonic motor can be driven by the stepping angle of 6 degrees, according to the present invention, the second wheel may be directly driven.

As previously described in detail, the ultrasonic motor according to the present invention is so constructed by employing an ultrasonic vibration generating circuit for generating a traveling wave used to drive said moving member, whose vibration wave number is "$\lambda$" and also for generating either one sort, or more than two sorts of standing waves used to stop said moving member; a switching circuit for switching operations of said traveling wave and of said standing wave; and at least one of said piezoelectric vibrator driven by said ultrasonic vibration generating circuit. Then, the moving member having such a load portion located in at least one of node portions during an oscillation of the standing wave in such a manner that one load portion is in contact with another load portion. As a result, the stepping angle of the moving member may be set to such a smaller value than the moving amount of the node portion of the standing wave by properly switching the traveling wave for driving the moving member and the standing wave for stopping the moving member.

Then, when the ultrasonic motor according to the present invention is applied to an electronic apparatus, the electronic apparatus can be driven in correct stepwise mode.

What is claimed is:

1. An ultrasonic motor comprising: a traveling wave generating circuit for generating a traveling wave signal having a wavelength "$\lambda$" effective to drive a moving member; a standing wave generating circuit for generating at least one type of standing wave signal effective to stop movement of the moving member; a switching circuit receptive of the traveling wave signal and the standing wave signal for selecting one of the traveling wave and the standing wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the standing wave, and the number of the load portions and the number of the nodes having one common divisor corresponding to a positive integer greater than one; and pressure regulating means for urging the moving member into pressure contact with the vibrating member.

2. An ultrasonic motor according to claim 1; further comprising a smoothing circuit for receiving an output signal of the piezoelectric vibrator and converting an envelope of a crest value of a current waveform into either a continuous signal or a pulsatory signal; a judging circuit for detecting a movement of the moving member in response to the signal from the smoothing circuit; and wherein the switching circuit outputs the traveling wave signal to drive the moving member in response to an output signal of the judging circuit and outputs the standing wave signal to stop the moving member.

3. An ultrasonic motor according to claim 1; wherein the number of the load portions of the moving member is equal to a number which can be evenly divided by 360.

4. An ultrasonic motor according to claim 1; wherein the load portions of the moving member are arranged at equal intervals along a circular direction of the moving member.

5. An ultrasonic motor according to claim 1; wherein the load portions of the moving member have an elastic characteristic in a vertical direction with respect to a sliding plane of the moving member.

6. An ultrasonic motor according to claim 1; wherein the vibrating member has a plurality of projection portions, and wherein the electrode pattern of the piezoelectric vibrator is subdivided and arranged at equal intervals along a circular direction of the piezoelectric vibrator, the subdivision number of the electrode pattern being $2n\lambda$, where "n" is a positive integer equal to or greater than one and the number of projection portions of the vibrating member has a value obtained by multiplying the subdivision number of the electrode pattern of the piezoelectric vibrator by an integer.

7. An ultrasonic motor according to claim 1; wherein the standing wave generating circuit generates a plurality of types of standing waves.

8. An ultrasonic motor comprising: a driving signal generating circuit for generating a driving wave signal having a wavelength "$\lambda$" effective to drive a moving member; a stopping signal generating circuit for generating at least one type of stopping wave signal effective to stop movement of the moving member; a switching circuit receptive of the driving wave signal and the stopping wave signal for selecting one of the driving wave and the stopping wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the driving wave, and the number of the load portions and the number of the nodes having one common divisor corresponding to a positive integer greater than one; and pressure regulating means for urging the moving member into pressure contact with the vibrating member.

9. An ultrasonic motor according to claim 8; further comprising a smoothing circuit for receiving an output signal of the piezoelectric vibrator and converting an envelope of a crest value of a current waveform into either a continuous signal or a pulsatory signal; a judging circuit for detecting movement of the moving member in response to the signal from the smoothing circuit; and wherein the switching circuit outputs a driving signal to drive the moving member in response to an output signal of the judging circuit and outputs a stopping signal to stop the moving member.

10. An ultrasonic motor according to claim 8; wherein the number of the load portions of the moving member is equal to a number which can be evenly divided by 360.

11. An ultrasonic motor according to claim 8; wherein the load portions of the moving member are arranged at equal intervals along a circular direction of the moving member.

12. An ultrasonic motor according to claim 8; wherein the load portions of the moving member have an elastic characteristic in a vertical direction with respect to a sliding plane of the moving member.

13. An ultrasonic motor according to claim 8; wherein the vibrating member has a plurality of projection portions, and wherein the electrode pattern of the piezoelectric vibrator is subdivided and arranged at equal intervals along a circular direction of the piezoelectric vibrator, the subdivision number of the electrode pattern being $2n\lambda$, where "n" is a positive integer equal to or greater than one and the number of projection portions of the vibrating member has a value obtained by multiplying the subdivision number of the electrode pattern of the piezoelectric vibrator by an integer.

14. An electronic apparatus comprising: a traveling wave generating circuit for generating a traveling wave signal having a wavelength "$\lambda$" effective to drive a moving member; a standing wave generating circuit for generating at least one type of standing wave signal effective to stop movement of the moving member; a switching circuit receptive of the traveling wave signal and the standing wave signal for selecting one of the traveling wave and the standing wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the standing wave, and the number of the load portions and the number of the nodes having one common divisor corresponding to a positive integer greater than one; pressure regulating means for urging the moving member into pressure contact with the vibrating member; support means for supporting the vibrating member; and output means driven by the moving member for producing an output motion.

15. An electronic apparatus according to claim 14; further comprising a smoothing circuit for receiving an output signal of the piezoelectric vibrator and converting an envelope of a crest value of a current waveform into either a continuous signal or a pulsatory signal; a judging circuit for detecting movement of the moving member in response to the signal from the smoothing circuit; and wherein the switching circuit outputs a traveling wave signal to drive the moving member in response to an output signal of the judging circuit and outputs a standing wave signal to stop the moving member.

16. An electronic apparatus according to claim 14; wherein the number of the load portions of the moving member is equal to a number which can be evenly divided by 360.

17. An electronic apparatus according to claim 14; wherein the load portions of the moving member are arranged at equal intervals along a circular direction of the moving member.

18. An electronic apparatus according to claim 14; wherein the load portions of the moving member have an elastic characteristic in a vertical direction with respect to a sliding plane of the moving member.

19. An ultrasonic motor according to claim 14; wherein the vibrating member has a plurality of projection portions, and wherein the electrode pattern of the piezoelectric vibrator is subdivided and arranged at equal intervals along a circular direction of the piezoelectric vibrator, the subdivision number of the electrode pattern being $2n\lambda$, where "n" is a positive integer equal to or greater than one and the number of projection portions of the vibrating member has a value obtained by multiplying the subdivision number of the electrode pattern of the piezoelectric vibrator by an integer.

20. An electronic apparatus according to claim 14; wherein the standing wave generating circuit generates a plurality of types of standing waves.

21. An electronic apparatus comprising: a driving signal generating circuit for generating a driving wave signal having a wavelength "$\lambda$" effective to drive a moving member; a stopping signal generating circuit for generating at least one type of wave signal effective to stop movement of the moving member; a switching circuit receptive of the driving wave signal and the stopping wave signal for selecting one of the driving wave and the stopping wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the driving wave, and the number of the load portions and the number of the nodes having one common divisor corresponding to a positive integer greater than one; pressure regulating means for urging the moving member into pressure contact with the vibrating member; support means for supporting the vibrating member; and output means driven by the moving member for producing an output motion.

22. An electronic apparatus according to claim 21; further comprising a smoothing circuit for receiving an output signal of the piezoelectric vibrator and converting an envelope of a crest value of a current waveform into either a continuous signal or a pulsatory signal; a judging circuit for detecting a movement of the moving member in response to the signal from the smoothing circuit; and wherein the switching circuit outputs a traveling wave signal to drive the moving member in response to an output signal of the judging circuit and outputs a standing wave signal to stop the moving member.

23. An electronic apparatus according to claim 21; wherein the number of the load portions of the moving member is equal to a number which can be evenly divided by 360.

24. An electronic apparatus according to claim 21; wherein the load portions of the moving member are arranged at equal intervals along a circular direction of the moving member.

25. An electronic apparatus according to claim 21; wherein the load portions of the moving member have an elastic characteristic in a vertical direction with respect to a sliding plane of the moving member.

26. An ultrasonic motor according to claim 21; wherein the vibrating member has a plurality of projection portions, and wherein the electrode pattern of the piezoelectric vibrator is subdivided and arranged at equal intervals along a circular direction of the piezoelectric vibrator, the subdivision number of the electrode pattern being $2n\lambda$, where "n" is a positive integer equal to or greater than one and the number of projection portions of the vibrating member has a value obtained by multiplying the subdivision number of the electrode pattern of the piezoelectric vibrator by an integer.

27. An ultrasonic motor comprising: a traveling wave generating circuit for generating a traveling wave signal having a wavelength "$\lambda$" effective to drive a moving member; a standing wave generating circuit for generating at least one type of standing wave signal effective to stop movement of the moving member; a switching circuit receptive of the traveling wave signal and the standing wave signal for selecting one of the traveling wave and the standing wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the standing wave; and pressure regulating means for urging the moving member into pressure contact with the vibrating member.

28. An ultrasonic motor comprising: a driving signal generating circuit for generating a driving wave signal having a wavelength "$\lambda$" effective to drive a moving member; a stopping signal generating circuit for generating at least one type of wave signal effective to stop movement of the moving member; a switching circuit receptive of the driving wave signal and the stopping wave signal for selecting one of the driving wave and the stopping wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member; and pressure regulating means for urging the moving member into pressure contact with the vibrating member.

29. An electronic apparatus comprising: a traveling wave generating circuit for generating a traveling wave signal having a wavelength "$\lambda$" effective to drive a moving member; a standing wave generating circuit for generating at least one type of standing wave signal effective to stop movement of the moving member; a switching circuit receptive of the traveling wave signal and the standing wave signal for selecting one of the traveling wave and the standing wave signals as an output signal; a piezoelectric vibrator drive circuit receptive of the output signal of the switching circuit for producing a high-frequency voltage signal; at least one piezoelectric vibrator having an electrode pattern and being driven by the voltage signal to undergo expansion and compression; a vibrating member fixed to the piezoelectric vibrator and vibrationally driven by the expansion and compression movement of the piezoelectric vibrator; a moving member disposed on the vibrating member to be frictionally driven by expansion and compression movement of the piezoelectric vibrator, the moving member having a plurality of load portions for stopping movement of the moving member, the load portions being greater in number than the number of nodes of the standing wave; pressure regulating means for urging the moving member into pressure contact with the vibrating member; supporting means for supporting the vibrating member; and output means driven by the moving member for producing an output motion.

* * * * *